US012689993B2

(12) United States Patent
Bergljung et al.

(10) Patent No.: US 12,689,993 B2
(45) Date of Patent: Jul. 21, 2026

(54) POWER CONTROL FOR MULTI-CHANNELS AND POWER PRIORITIZATION

(71) Applicant: Telefonaktiebolaget LM Ericsson (publ), Stockholm (SE)

(72) Inventors: Christian Bergljung, Lund (SE); Daniel Chen Larsson, Lund (SE); Fredrik Sundström, Sundbyberg (SE); Mikael Zirén, Kävlinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 459 days.

(21) Appl. No.: 18/249,317

(22) PCT Filed: Oct. 20, 2021

(86) PCT No.: PCT/EP2021/079052
§ 371 (c)(1),
(2) Date: Apr. 17, 2023

(87) PCT Pub. No.: WO2022/084376
PCT Pub. Date: Apr. 28, 2022

(65) Prior Publication Data
US 2023/0413192 A1 Dec. 21, 2023

Related U.S. Application Data

(60) Provisional application No. 63/104,212, filed on Oct. 22, 2020.

(51) Int. Cl.
*H04W 52/36* (2009.01)
(52) U.S. Cl.
CPC ................................. *H04W 52/367* (2013.01)

(58) Field of Classification Search
CPC . H04W 52/367; H04W 52/36; H04W 52/327; H04W 52/30
See application file for complete search history.

(56) References Cited

U.S. PATENT DOCUMENTS

| 2008/0123520 | A1* | 5/2008 | Ji | H04W 72/52 |
| | | | | 370/216 |
| 2020/0329437 | A1* | 10/2020 | MolavianJazi | H04W 76/15 |
| 2021/0297826 | A1* | 9/2021 | Volkerink | H04W 4/70 |

FOREIGN PATENT DOCUMENTS

| WO | 2019158461 A1 | 8/2019 |
| WO | 2020164724 A1 | 8/2020 |
| WO | 2020201827 A1 | 10/2020 |

OTHER PUBLICATIONS

International Search Report and Written Opinion dated Feb. 2, 2022 for International Application No. PCT/EP2021/079052 filed on Oct. 20, 2021, consisting of 9 pages.

(Continued)

*Primary Examiner* — John J Lee
(74) *Attorney, Agent, or Firm* — Sage Patent Group

(57) ABSTRACT

A method, network node and wireless device (WD) and apparatus for power control for multiple channels and power prioritization are disclosed. According to one aspect, a method in a network node includes determining a first WD-specific power limit for each cell c of a cell group that includes at least one primary cell, PCell, and up to N secondary cells, SCells, N being a non-negative integer. The method also includes transmitting an indication of the first WD-specific power limit.

16 Claims, 9 Drawing Sheets

(56)             References Cited

OTHER PUBLICATIONS

3GPP TSG-RAN WG4 Meeting #100-e; Title: Resolving the Scell dropping using power limits on serving cells; [99-e] [127] NR_RF_FR1_enh_Part_1_HPUE_ULMIMO; Ericsson; Location and Date: Electronic meeting, Aug. 16-27, 2021, consisting of 8 pages.

3GPP TS 38.101-1 v16.4.0; 3rd Generation Partnership Project; Technical Specification Group Radio Access Network; NR; User Equipment (UE) radio transmission and reception; Part 1: Range 1 Standalone (Release 16); Jun. 2020, consisting of 406 pages.

3GPP TS 38.101-2 v16.4.0; 3rd Generation Partnership Project; Technical Specification Group Radio Access Network; NR; User Equipment (UE) radio transmission and reception; Part 2: Range 2 Standalone (Release 16), Jun. 2020, consisting of 172 pages.

3GPP TS 38.101-3 v16.5.0; 3rd Generation Partnership Project; Technical Specification Group Radio Access Network; NR; User Equipment (UE) radio transmission and reception; Part 3: Range 1 and Range 2 Interworking operation with other radios (Release 16); Sep. 2020, consisting of 496 pages.

3GPP TS 38.213 v16.3.0; 3rd Generation Partnership Project; Technical Specification Group Radio Access Network; NR; Physical layer procedures for control (Release 16); Sep. 2020, consisting of 179 pages.

3GPP TS 38.215 v16.30; 3rd Generation Partnership Project; Technical Specification Group Radio Access Network; NR; Physical layer measurements (Release 16); Sep. 2020, consisting of 25 pages.

* cited by examiner

BEGIN

CONFIGURE THE WD WITH A WD-SPECIFIC POWER LIMITATION FOR
AT LEAST ONE SERVING CELL, THE WD-SPECIFIC POWER LIMITATION
BEING LESS THAN A CONFIGURED MAXIMUM POWER FOR A
PRIMARY CELL  S134

END

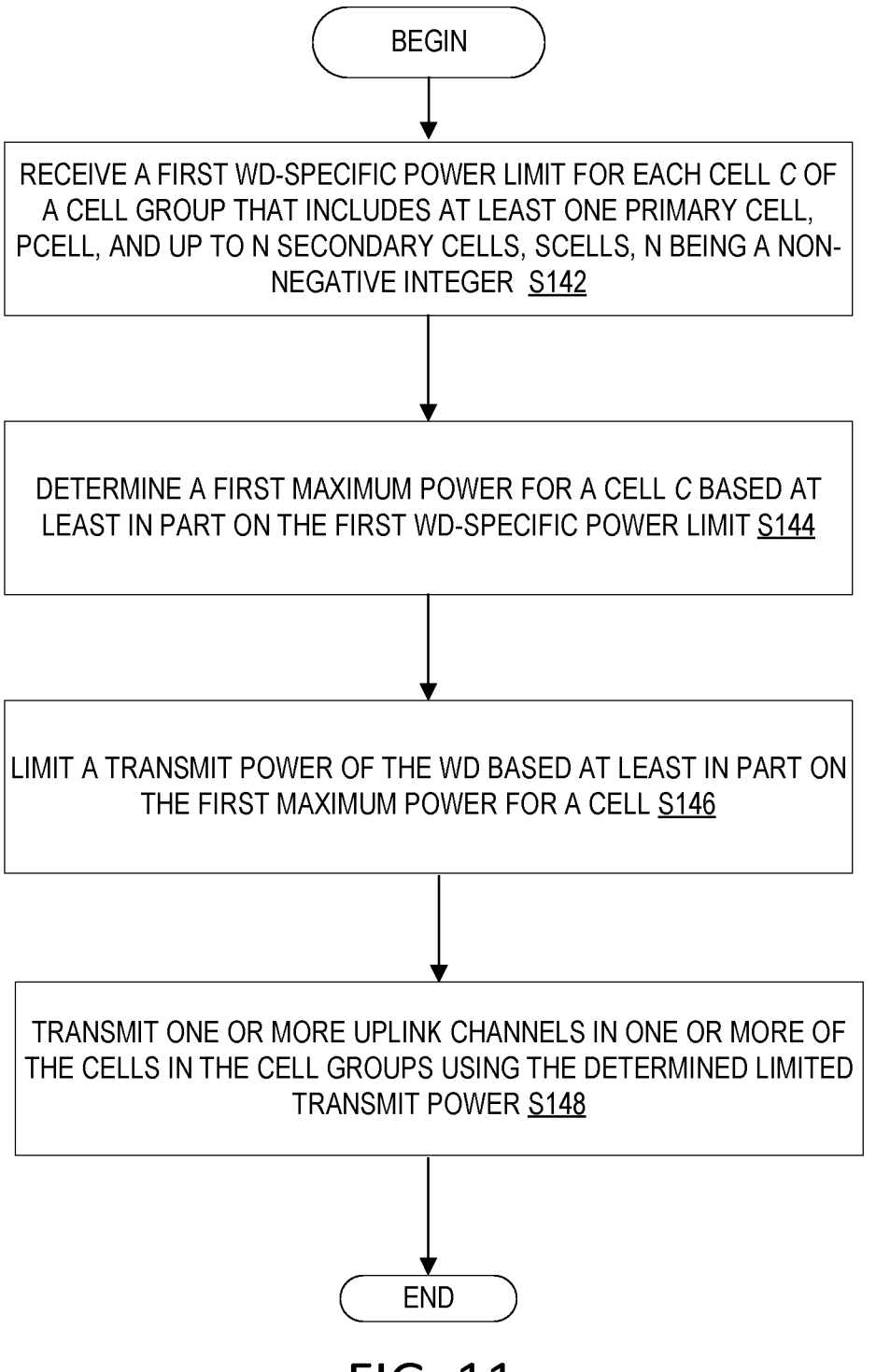

BEGIN

RECEIVE A FIRST WD-SPECIFIC POWER LIMIT FOR EACH CELL $C$ OF A CELL GROUP THAT INCLUDES AT LEAST ONE PRIMARY CELL, PCELL, AND UP TO N SECONDARY CELLS, SCELLS, N BEING A NON-NEGATIVE INTEGER  S142

DETERMINE A FIRST MAXIMUM POWER FOR A CELL $C$ BASED AT LEAST IN PART ON THE FIRST WD-SPECIFIC POWER LIMIT S144

LIMIT A TRANSMIT POWER OF THE WD BASED AT LEAST IN PART ON THE FIRST MAXIMUM POWER FOR A CELL S146

TRANSMIT ONE OR MORE UPLINK CHANNELS IN ONE OR MORE OF THE CELLS IN THE CELL GROUPS USING THE DETERMINED LIMITED TRANSMIT POWER S148

END

FIG. 11

POWER CONTROL FOR MULTI-CHANNELS AND POWER PRIORITIZATION

CROSS-REFERENCE TO RELATED APPLICATIONS

This application is a Submission Under 35 U.S.C. § 371 for U.S. National Stage Patent Application of International Application No.: PCT/EP2021/079052, filed Oct. 20, 2021 entitled "POWER CONTROL FOR MULTI-CHANNELS AND POWER PRIORITIZATION," which claims priority to U.S. Provisional Application No. 63/104,212, filed Oct. 22, 2020, entitled "POWER CONTROL FOR MULTI-CHANNELS AND POWER PRIORITIZATION," the entireties of both of which are incorporated herein by reference.

TECHNICAL FIELD

The present disclosure relates to wireless communications, and in particular, to power control for multiple channels and power prioritization.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Wireless communication systems according to the 3GPP may include one or more of the following channels:

A physical downlink control channel, PDCCH;
A physical uplink control channel, PUCCH;
A physical downlink shared channel, PDSCH;
A physical uplink shared channel, PUSCH;
A physical broadcast channel, PBCH; and
A physical random access channel, PRACH.

Just as for LTE, multiple NR carriers can be aggregated and transmitted in parallel to and from the same WD in order to increase the total transmission bandwidth beyond the maximum per carrier and thereby the user- and system data rates. Carrier aggregation can be configured both in the downlink and uplink directions. The aggregated carriers are denoted component carriers.

For carrier aggregation (CA), each component carrier corresponds to a serving cell providing radio services. One of the cells is denoted the primary cell (PCell), having a carrier operating on the primary frequency, in which the WD either performs the initial establishment of the connection or initiates re-establishment of the connection if the connection is lost. One or more secondary cells (SCell), having component carriers operating on secondary frequencies, can then be added (aggregated) or released (removed) as appropriate, e.g., depending on the radio-link conditions.

Different number of component carriers (cells) can be aggregated in the downlink and uplink. Thus, a serving cell has a downlink and an uplink carrier or only a downlink carrier (the latter only for SCells). The number of uplink carriers cannot exceed the number of downlink carriers. Aggregated component carriers do not have to be contiguous (adjacent) in frequency; carriers can be aggregated within a frequency band (intra-band CA) or between frequency bands (inter-band CA) or in a combination of intra-band and inter-band CA. For intra-band CA, component carriers (CC) can be contiguous or non-contiguous, as shown in FIG. 1.

Related to carrier aggregation is the concept of supplementary uplink (SUL). For SUL, a single cell consists of one downlink carrier and two uplink carriers at two carrier frequencies that are usually in different bands: the normal uplink (NUL) associated with the downlink carrier and the SUL. Hence for a cell with SUL, the number of uplink carriers is larger than the number of downlink carriers.

The serving cells are contained within one or two cell groups (CG), each cell group associated with a network node. Dual connectivity (DC) allows a WD to communicate with two cell groups, the master cell group (MCG) associated with a master node (e.g., an LTE eNB or and NR gNB), and a secondary cell group (SCG) associated with a secondary node (e.g., an LTE eNB or and NR gNB). Carriers can be aggregated within a cell group. For NR the WD is configured with at least one cell group, which is the MCG if the WD is not configured with DC.

For uplink carrier aggregation the WD output power for uplink transmissions (UE to base station) is controlled independently for each cell c and carrier frequency f. The power control for uplink transmissions in a transmission occasion i typically involve both open- and closed-loop control:

$$P_{f,c}(i) = \min[P_{CMAX,f,c}(i), P_0 + \alpha_{f,c} PL_{f,c} + 10 \log M_{f,c}(i) + \Delta_{f,c}(i) + \delta_{f,c}(i)]$$

where $P_0$ is the target received power at the receiver (the gNB for NR), $PL_{f,c}$ the path-loss estimate with a weight factor $\alpha_{c,f}$ (the sum $P_0 + \alpha_{f,c} PL_{f,c}$ the which may be the required output power per resource for open-loop control), $M_{f,c}$ the allocated resource bandwidth, $\Delta_{f,c}$ including factors such as the uplink modulation format and $\delta_{f,c}$ a relative power change for closed-loop control.

The output power as determined by open- and closed loop power is limited by the maximum output power $P_{CMAX,f,c}(i)$ configured, computed, allowed, or supported by the WD for cell c and carrier frequency f. It is noted that, in some regions, the maximum allowed transmission power in some frequency bands is limited by regulations. Therefore, a WD is not permitted to transmit more than what is allowed, even if the WD is able to operate at a higher power. The configured $P_{CMAX,f,c}(i)$ applies for all types of transmissions (PUCCH, PUSCH and sounding reference signal (SRS)). For CA, there is only one carrier frequency f for a cell c (one $P_{CMAX,f,c}$ value configured per cell) whereas for SUL there are two carrier frequencies f for a cell c (one $P_{CMAX,f,c}$ value configured per carrier frequency f).

For lower frequencies (for NR in frequency range FR1 below 7 GHz) for which the output power can be measured at the antenna connector, the $P_{CMAX,f,c}(i)$ that is configured can essentially be described by:

$$P_{CMAX,f,c}(i) \sim \min[P_{power\ class}, f(P_{power\ class}, MPR), P_{Max}]$$

and is limited by:

the power capability $P_{power\ class}$ of the WD;

a function $f(P_{power\ class}, MPR) \le P_{power\ class}$ of the power capability and maximum power reductions (MPR) allowed for compliance with e.g. unwanted emissions requirements (other factors like RF front-end filter attenuations are also accounted for); and/or a cell-specific or WD-specific limitation P_Max (absolute) indicated to the WD by the network node in the system information broadcasted in the cell or by dedicated signaling to the WD.

The WD-specific $P_{Max}$ is a limitation of the total power of the cell group containing the serving cell c. The WD is allowed a power-back-off up to MPR (dB) but does not necessarily use the full allowance. The $P_{CMAX,f,c}(i)$ is therefore specified in a range for a single serving cell in FR1.

The configured maximum output power $P_{CMAX,f,c}$ is set within the following bounds:

$$P_{CMAX\_L,f,c} \leq P_{CMAX,f,c} \leq P_{CMAX\_H,f,c} \text{ with:}$$

$$P_{CMAX\_L,f,c} = \text{MIN}\{P_{EMAX,c} - \Delta T_{C,c}, (P_{PowerClass} - \Delta P_{PowerClass}) - \text{MAX}(\text{MAX}(MPR_c + \Delta MPR_c, A - MPR_c) + \Delta T_{IB,c} + \Delta T_{C,c} + \Delta T_{RxSRS}, P - MPR_c)\}$$

$$P_{CMAX\_H,f,c} = \text{MIN}\{P_{EMAx,c}, P_{PowerClass} - \Delta P_{PowerClass}\}$$

where the lower bound is governed by the maximum allowed back-off MPR while both the upper and lower bounds are limited by the power class $P_{power\ class}$ and a cell-specific limit class $P_{Max}$ (the $P_{EMAX,c}$). Other allowed power reductions accounting for filter attenuation ($\Delta T_C$) also reduce the lower bound at the edges of carriers but are not included in what follows for notational simplicity without loss of generality. The upper bound corresponds to the case in which the WD is not applying any power back-off and is limited by the power class and power limits only. The corresponding expressions for dual connectivity also contain a limit on the cell-group power.

For higher frequencies, e.g., for NR in the frequency range FR2 above 24 GHz, the maximum power $P_{CMAX,c,f}$ as configured for uplink power is not directly related to the power capability $P_{power\ class}$ of the WD. This is due to the difficulty of testing the WD for conformance to the output power at the (many) antenna connectors embedded in an FR2 antenna design; the output power of a WD can therefore only be verified using radiated measurements.

For FR2, the $P_{CMAX,c,f}$ is specified in a plane of reference that is implementation specific (likely at the internal antenna connectors or before these) whereas the power class $P_{power\ class}$ is the radiated equivalent isotropic radiated power (EIRP).

The WD can configure its maximum output power. The configured WD maximum output power $P_{CMAX,f,c}$ for carrier f of a serving cell c is defined as that available to the reference point of a given transmitter branch that corresponds to the reference point of the higher-layer filtered RSRP measurement as specified in 3GPP Technical Standard (TS) 38.215-v 16.3.0.

The configured WD maximum output power $P_{CMAX,f,c}$ for carrier f of a serving cell c may be set such that the corresponding measured peak EIRP $P_{UMAX,f,c}$ is within the following bounds:

$$P_{Powerclass} - \text{MAX}(\text{MAX}(MPR_{f,c}, A - MPR_{f,c}) + \Delta MB_{P,n}, P - MPR_{f,c}) - \text{MAX}\{T(\text{MAX}(MPR_{f,c}, A - MPR_{f,c})), T(P - MPR_{f,c})\} \leq P_{UMAX,f,c} \leq \text{EIRP}_{max}$$

while the corresponding measured total radiated power $P_{TMAX,f,c}$ is bounded by:

$$P_{TMAX,f,c} \leq \text{TRP}_{max}$$

Another difference from FR1 is that there is no configurable limitation $P_{Max}$ (neither cell- nor WD-specific) in the configured maximum in the current version of the 3GPP standard. This is due to the difficulty of setting an absolute limit (in dBm) with over-the-air requirements.

For CA, the WD also configures a maximum total power $P_{CMAX}$ for all aggregated serving cells of a CA combination. For FR1 the $P_{CMAX}$ is specified at the antenna connector and includes the power back-off applied on the serving cells part of the CA configuration, whereas for FR2 this is also specified in an implementation specific plane of reference.

From 3GPP TS 38.101-2 v16.4.0, a WD configured with carrier aggregation can configure its maximum output power for each uplink activated serving cell c and its total configured maximum output power $P_{CMAX}$. The definition of the configured WD maximum output power $P_{CMAX,f,c}$ for each carrier f of a serving cell c is used for power headroom reporting for carrier f of serving cell c only and is in accordance with that specified in clause 6.2.4 of the aforementioned technical standard with parameters maximum power reduction (MPR), A-MPR and P-MPR replaced with those specified in subclause 6.2A.2, 6.2A.3 and 6.2.4, of the above-mentioned 3GPP TS, respectively. The WD maximum configured power $P_{CMAX}$ in a transmission occasion is determined by the uplink (UL) grants for carrier f of serving cell's c(i) with non-zero granted power in the respective reference points.

For uplink intra-band contiguous carrier aggregation, MPR is specified in clause 6.2A.2. of the 3GPP TS 38.101-2 v16.4.0. $P_{CMAX}$ is calculated under the assumption that power spectral density for each resource block (RB) in each component carrier is the same.

The configured WD maximum output power $P_{CMAX}$ may be set such that the corresponding measured total peak EIRP $P_{UMAX}$ is within the following bounds:

$$P_{Powerclass} - \text{MAX}(\text{MAX}(MPR, A\_MPR) + \Delta MB_{P,n}, P - MPR) - \text{MAX}\{T(\text{MAX}(MPR, A\_MPR)), T(P - MPR)\} \leq P_{UMAX} \leq \text{EIRP}_{max}$$

with $P_{Powerclass}$ being the peak EIRP as specified in 3GPP TS 38.101-2 v16.4.0, sub-clause 6.2A.1. EIRP$_{max}$ is the applicable maximum EIRP as specified in 3GPP TS 38.101-2 v16.4.0, sub-clause 6.2A.1, MPR is as specified in 3GPP TS 38.101-2 v16.4.0 sub-clause 6.2A.2, A-MPR is as specified in 3GPP TS 38.101-2 v16.4.0 sub-clause 6.2A.3, $\Delta MB_{P,n}$ is the peak EIRP relaxation as specified in 3GPP TS 38.101-2 v16.4.0 clause 6.2.1, P-MPR the power management term for the WD as described in 3GPP TS 38.101-2 v16.4.0 clause 6.2.4 and TRP$_{max}$ the maximum TRP for the WD power class as specified in 3GPP TS 38.101-2 v16.4.0 sub-clause 6.2A.1.

The measured configured power $P_{UMAX}$ for carrier aggregation is defined as $$P_{UMAX} = 10 \log_{10} \sum_{c,f(c)} p_{UMAX,f,c}$$

where $p_{UMAX,f,c}$ is the linear value of the measured power $P_{UMAX,f,c}$ for carrier $f = f(c)$ serving cell c.

The configured total power $P_{CMAX}$ for all aggregated serving cells of a CA combination is used for prioritizations of transmission power when the WD is power limited.

For single cell operation with two uplink carriers or for operation with carrier aggregation, if a total WD transmit power for physical uplink shared channel (PUSCH), physical uplink control channel (PUCCH), physical random access channel (PRACH) or sounding reference signal (SRS) transmissions on serving cells in a frequency range in a respective transmission occasion i would exceed $\hat{P}_{CMAX}(i)$, where $\hat{P}_{CMAX}(i)$ is the linear value of $P_{CMAX}(i)$ in transmission occasion i as defined in 3GPP TS 38.101-1 for FR1, and 3GPP TS 38.101-2 for FR2, then the WD allocates power to PUSCH/PUCCH/PRACH/SRS transmissions according to the following priority order (in descending order).

5

PRACH transmission on the Pcell

PUCCH or PUSCH transmissions with higher priority index according to Clause 9;

For PUCCH or PUSCH transmissions with same priority index;

PUCCH transmission with HARQ-ACK information, and/or SR, and/or LRR, or PUSCH transmission with HARQ-ACK information;

PUCCH transmission with CSI or PUSCH transmission with CSI;

PUSCH transmission without HARQ-ACK information or CSI and, for Type-2 random access procedure, PUSCH transmission on the PCell; and/or SRS transmission, with aperiodic SRS having higher priority than semi-persistent and/or periodic SRS, or PRACH transmission on a serving cell other than the Pcell.

This is done for the total WD transmit power for transmissions on serving cells in the frequency range is smaller than or equal to $\hat{P}_{CMAX}(i)$ for that frequency range in every symbol of transmission occasion i. When determining a total transmit power for serving cells in a frequency range in a symbol of transmission occasion i, the WD does not include power for transmissions starting after the symbol of transmission occasion i. The total WD transmit power in a symbol of a slot is defined as the sum of the linear values of WD transmit powers for PUSCH, PUCCH, PRACH, and SRS in the symbol of the slot.

In case of same priority order and for operation with carrier aggregation, the WD prioritizes power allocation for transmissions on the primary cell of the MCG or the SCG over transmissions on a secondary cell. In case of same priority order and for operation with two UL carriers, the WD prioritizes power allocation for transmissions on the carrier where the WD is configured to transmit PUCCH. If PUCCH is not configured for any of the two UL carriers, the WD prioritizes power allocation for transmissions on the non-supplementary UL carrier.

Given a total power $P_{CMAX}$, the WD allocates power for transmission types in a priority order when power limited. This means that for example, PUCCH transmissions can be allocated the full power in the absence of simultaneous PRACH transmissions. Moreover, the rules imply that the primary cell (PCell) is prioritized for a given transmission, e.g., for simultaneous PUSCH transmissions on multiple serving cells.

For LTE CA, the corresponding prioritization rules are slightly different. Some power, if available, should be left for the secondary cells. The allowance of WD power back-off for UL CA makes prioritization of power and conformance testing of the output power more complex for FR2. The MPR is relative to the (radiated) power class $P_{power\ class}$ but is not necessarily represented by the same value in the planes of reference of the $P_{CMAX}$ or the $P_{CMAX,f,c}$ that are different and implementation specific (internal within the WD). There is a relationship in the output power requirement for a WD configured with UL intra-band CA. In this relationship, $P_{CMAX}$ may be configured such that the measured total radiated power $P_{UMAX}$ is within:

$$P_{power\ class}-\mathrm{MPR}-T(\mathrm{MPR})\leq P_{UMAX}\leq\mathrm{EIRP}_{max}$$

with MPR the allowed power back-off of the total signal and:

$$p_{UMAX}=\sum_{f,c}p_{UMAX,f,c}$$

6 where $P_{UMAX,f,c}$ is the radiated power for serving cell c in linear scale (the A-MPR, P-MPR and multiband-relaxation dropped in expressions for convenience of notation without loss of generality). In practical designs, $P_{CMAX}$ often represents the conducted output power feeding the antenna, which means that the power relation (MPR) between cells is similar to the measured (radiated) in the antenna beam peak. Similarly, in case the WD is not configured with UL CA, the $P_{CMAX,f,c}$ internal within the WD may be configured such that the measured radiated power of the cell c is within:

$$P_{power\ class}-\mathrm{MPR}_{f,c}-T(\mathrm{MPR}_{f,c})\leq P_{UMAX,c,f}\leq\mathrm{EIRP}_{max}$$

with $\mathrm{MPR}_{c,f}$ is the allowed power back-off for a single cell, which is usually less than the MPR allowed for the cell when part of an intra-band CA configuration. In the latter case, the MPR allowed for the total power is the same as that allowed for the active serving cells of the configuration. The current power prioritization rules for UL CA allow the WD to drop the secondary cells when power limited and transmit the Pcell only, whole still at a power back-off up to MPR (i.e., not limited by the non-CA allowance $\mathrm{MPR}_{c,f}\leq\mathrm{MPR}$ as the WD is configured with CA).

The actual WD maximum output power on a serving cell, including the actual back-off applied, can be inferred from the power headroom report (PHR), which may also include the actual $P_{CMAX,f,c}$. This report can be triggered or is sent periodically, typically with a 20-50 ms periodicity, but the reporting accuracy is limited (not down to single decibels).

High-power WD operation (26 dBm power class) is specified for LTE-NR dual connectivity and will be specified for CA in the next version of the 3GPP specifications. For dual connectivity, the WD configures a total maximum total power across the cell groups (master and secondary)

$$P_{tot}^{DC}:$$

$$p_{tot}^{DC}\geq p_{MSG}+p_{SCG}$$

that is larger than or equal to the sum of output powers per cell group, $P_{MCG}$ and $P_{SCG}$. For the respective MCG and SCG (small letters for linear scale). In case there is a power limitation for DC, the WD prioritizes power of the MSG. The total output power per cell group, i.e., all serving cells within the group, can be limited by a WD-specific $P_{Max}$.

For New Radio dual connectivity (EN-DC) frequency division duplex-time division duplex (FDD-TDD) high-power operation (26 dBm), it has been considered that the total cell-group power of the MSG in Evolved Universal Terrestrial Radio Access (EUTRA) be limited by a WD-specific $$P_{Max}<P_{tot}^{DC}$$

to increase (reserve additional) power for the SCG (NR) given a total configured power $$P_{tot}^{DC}.$$

This is to enable an SCG power>23 dBm during SCG transmission bursts while keeping the total average output power less than 23 dBm in order to facilitate SAR compliance (permissible exposure) by setting $$P_{tot}^{DC}$$

appropriately. The power limitation is signalled over radio resource control (RRC) signaling (higher layers). This would have implied a slow adaptation to changing radio conditions: in case the LTE coverage is impaired and the $P_{Max}$ limitation should be removed (released) temporarily, then the EN-DC connection would have to be released and then re-established once the LTE coverage improves. However, it should be noted that this method is not included in the 3GPP specifications; EN-DC high-power operation with SCG in a TDD band is only supported by means of proprietary power management and duty-cycle reporting in the current version of the standard.

For CA, the prioritization of transmission power reduction implies that secondary cells may be dropped for a given transmission type. This is because, for example, that the instantaneous transmission on the primary cell (optional together with some secondary cells) may have exceeded the total power limit, or other reasons, e.g., WD implementations to avoid overheating or distortion. Such an instantaneous situation cannot be reported to the network immediately as power headroom reports from the WD may not be frequent enough to do so. Therefore, some of the secondary cells may be dropped for a given transmission type. It is not possible to configure by signalling a WD-specific P_Max limitation for a serving cell within a group of cells in order to reserve power for secondary cells in the same group, only the total power per cell group can be limited. For FR2, absolute power limitations cannot be used to reduce the configured maximum output power for a serving cell (nor for a cell group) according to the present version of the 3GPP standard.

Network control of the absolute WD output power on each serving cell and thereby power prioritization between cells is not viable: power headroom reports are scarce, and the reporting accuracy is not sufficient.

For CA with high-power WD operation, it is not possible to use WD-specific power limitations for individual serving cells within a cell group for facilitating SAR compliance. One has to resort to proprietary solutions or uplink duty-cycle restrictions (as for TDD) with poor predictability for the network following the current version of the standard. A cell-specific power limitation P_Max can be configured, but this would also affect WDs not configured with CA.

For EN-DC or NR-DC with high-power WD operation, on the other hand, power limitations on the cell group level could be used for increasing the power on one of the cell groups (typically in a TDD band), but the signalling is by higher layers that implies a slow adaptation to changing radio conditions (which requires a release and subsequent re-establishment of the DC connection when radio conditions on the master cell group have improved).

SUMMARY

Some embodiments advantageously provide methods, network nodes and WDs for power control for multiple channels and power prioritization.

In some embodiments, dropping of secondary cells is prevented by the network node configuring the WD with a WD-specific limitation $P_{max}$ per serving cell. A power limit $P_{max}$ less than the configured maximum power $P_{CMAX,f,c}$ for the primary cell can be used to reserve remaining power for secondary cells. The WD-specific limitation $P_{Max}$ per serving cell can be absolute (dBm) or relative (dB). For FR2 the $P_{CMAX,f,c}$ (per cell) and $P_{CMAX}$ (total power) configured by the WD are specified in implementation-specific plane of references unknown to the network node; limits relative to these or between serving cells is configured by the network node to reserve WD power for secondary cells or transmissions of a specific type. Notwithstanding, relative limits can also be used for FR1 band combinations.

The WD-specific limitation $P_{max}$ per serving cell is sent either by higher-layers, MAC control elements or in downlink control information (DCI). Sets of serving cell power limits $P_{max}$ are defined for a group of cells and indicated by, e.g., a medium access control (MAC) control element (CE) or in DCI. In particular, the power limitations (indication of sets) can be modified by DCI which allows for faster adaptation of limits to changing radio conditions.

According to one aspect, a network node configured to communicate with a wireless device, WD, is provided. The network node includes processing circuitry is configured to determine a first WD-specific power limit for each cell c of a cell group that includes at least one primary cell, PCell, and up to N secondary cells, SCells, N being a non-negative integer. The network node also includes a radio interface in communication with the processing circuitry, the radio interface configured to transmit an indication of the first WD-specific power limit.

According to this aspect, in some embodiments, the processing circuitry is further configured to determine a first cell-specific power limit, $P_{Max}$, that applies to all WDs within a cell, each WD configured to use the PCell and the up to N SCells. In some embodiments, the first WD-specific power limit is transmission type-specific, a transmission type including at least one of a physical uplink shared channel PUSCH and a physical uplink control channel, PUCCH. In some embodiments, the first WD-specific power limit is transmission type-specific, a transmission type including at least one of a physical uplink shared channel, PUSCH, with uplink control information, UCI, and a PUSCH without UCI. In some embodiments, the first WD-specific power limit is also transmission type-specific, a transmission type including a sounding reference signal, SRS. In some embodiments, the processing circuitry is further configured to determine WD-specific power limits, $$X_{max,f,c}^{(k)},$$

for each cell c in the cell group relative to a reference level, where k denotes a particular one of at least one set, each of the at least one set corresponding to a transmission type. In some embodiments, the processing circuitry is further configured to adapt the at least one first WD-specific power limit based at least in part on a state of a radio channel between the network node and the WD. In some embodiments, the processing circuitry is further configured configure an uplink duty cycle of at least one serving cell to achieve an average power during a time duration that is not greater than a default power class limit. In some embodiments, the first WD-specific power limit is indicated by at least one of downlink control information, DCI, and a medium access control, MAC, CE. In some embodiments, the first WD-specific power limit for each cell c in the cell group is configured for each of a plurality of carrier frequencies, According to another aspect, a method in a network node configured to communicate with a wireless device, WD, is provided. The method includes determining a first WD-specific power limit for each cell c of a cell group that includes at least one primary cell, PCell, and up to N secondary cells, SCells, N being a non-negative integer. The method also includes transmitting an indication of the first WD-specific power limit. In some embodiments, the method further includes determining a first cell-specific power limit, $P_{Max}$, that applies to all WDs within a cell, each WD configured to use the PCell and the up to N SCells. In some embodiments, the first WD-specific power limit is transmission type-specific, a transmission type including at least one of a physical uplink shared channel PUSCH and a physical uplink control channel, PUCCH. In some embodiments, the first WD-specific power limit is transmission type-specific, a transmission type including at least one of a physical uplink shared channel, PUSCH, with uplink control information, UCI, and a PUSCH without UCI. In some embodiments, the first WD-specific power limit is transmission type-specific, a transmission type including a sounding reference signal, SRS. In some embodiments, the method also includes determining WD-specific power limits, $$X_{max,f,c}^{(k)},$$

for each cell c in the cell group relative to a reference level, where k denotes a particular one of at least one set, each of the at least one set corresponding to a transmission type. In some embodiments, the method also includes adapting the at least one first WD-specific power limit based at least in part on a state of a radio channel between the network node and the WD. In some embodiments, the method also includes configuring an uplink duty cycle of at least one serving cell to achieve an average power during a time duration that is not greater than a default power class limit. In some embodiments, the first WD-specific power limit is indicated by at least one of downlink control information, DCI, and a medium access control, MAC, CE. In some embodiments, the first WD-specific power limit for each cell c in the cell group is configured for each of a plurality of carrier frequencies.

According to yet another aspect, a WD is configured to communicate with a network node on a primary cell, PCell, and up to N secondary cells, SCells, N being a non-negative integer. The WD includes a radio interface configured to receive a first WD-specific power limit for each cell c of a cell group that includes at least one primary cell, PCell, and up to N secondary cells, SCells, N being a non-negative integer. The WD also includes processing circuitry in communication with the radio interface, the processing circuitry configured to: determine a first maximum power for a cell c, $P_{CMAX,f,c}(i)$, based at least in part on the first WD-specific power limit; and limit a transmit power of the WD based at least in part on the first maximum power for the PCell, $P_{CMAX,f,c}(i)$.

According to this aspect, in some embodiments, the radio interface is further configured to receive a first cell-specific power limit, $P_{Max}$, that applies to all WDs within a cell, each WD configured to use the PCell and the up to N SCells and wherein $P_{CMAX,f,c}(i)$ is further based at least in part on the first cell-specific power limit, $P_{Max}$. In some embodiments, the processing circuitry is further configured to determine $P_{CMAX,f,c}(i)$ by determining:

$$P_{CMAX,f,c}(i) = \min\left[P_{power\ class}, f(P_{power\ class}, MPR), P_{Max}, P_{max,f,c}^{(k)}\right]$$

where $P_{power\ class}$ is a WD power class applicable to a serving cell operating frequency band, k indicates a transmission type, MPR is a maximum permissible radiation limit, $P_{max,f,c}^{(k)}$ is an absolute WD-specific power limit and the function $f$ represents a maximum power back off. In some embodiments, $f$ is a function of at least one of a power class, a bandwidth allocation, band-dependent attenuation, and maximum allowed power back-off. In some embodiments, a transmission type includes at least one of a physical uplink shared channel PUSCH and a physical uplink control channel, PUCCH. In some embodiments, a transmission type includes at least one of a physical uplink shared channel, PUSCH, with uplink control information, UCI, and a PUSCH without UCI. In some embodiments, a transmission type includes a sounding reference signal, SRS. In some embodiments, the processing circuitry is further configured to: determine a total power, $P_{CMAX}$, that includes a sum of a power of the PCell plus a power of the up to N SCells, and to apply $P_{CMAX}$; and determine an amount of power available for the up to N SCells based at least in part on a difference given by $$P_{CMAX} - P_{max,f,PCell}^{(k)} \text{ where } P_{max,f,PCell}^{(k)}$$

is power allocated to the PCell. In some embodiments, the radio interface is further configured to receive at least one relative power limit, $$X_{max,f,c}^{(k)},$$

for a cell c in the cell group relative to a reference level and the processing circuitry is further configured to determine $P_{CMAX,f,c}(i)$ based at least in part on the difference, $$P_{CMAX,f,c} - X_{max,f,c}^{(k)}.$$

In some embodiments, the processing circuitry is further configured to limit the transmit power based at least in part on the first maximum power, $P_{CMAX,f,c}(i)$, for a cell c in the cell group for a first duration of time configured by the network node. In some embodiments, the processing circuitry is further configured to:

count a number of times during a time interval that the first maximum power for the PCell, $P_{CMAX,f,c}(i)$, is reached by the transmit power during the first duration of time; compare the number of times to a threshold; and when the number of times exceeds the threshold, continuing to limit the transmit power based at least in part on $$P_{max,f,PCell}^{(k)},$$

for a current set, k, where $$P^{(k)}_{max,f,PCell}$$

is a power allocated to the PCell.

According to another aspect, a method is provided in a wireless device, WD, configured to communicate with a network node. The method includes receiving a first WD-specific power limit for each of at least one primary cell, PCell, and up to N secondary cells, SCells, N being a non-negative integer. The method also includes determining a first maximum power for the PCell, $P_{CMAX,f,c}(i)$, based at least in part on the first WD-specific power limit. The method also includes limiting a transmit power of the WD based at least in part on the first maximum power for the PCell, $P_{CMAX,f,c}(i)$.

According to this aspect, in some embodiments, the method includes receiving the first cell-specific power limit, $P_{Max}$, that applies to all WDs within a cell, each WD configured to use the PCell and the up to N SCells, and wherein $P_{CMAX,f,c}(i)$, is further based at least in part on a first cell-specific power limit, $P_{Max}$. In some embodiments, the method also includes determining $P_{CMAX,c,f}(i)$ includes determining:

$$P_{CMAX,f,c}(i) = \min[P_{power\ class}, f(P_{power\ class}, MPR), P_{Max}, P^{(k)}_{max,f,c}]$$

where $P_{power\ class}$ is a WD power class applicable to a serving cell operating frequency band, k indicates a transmission type, MPR is a maximum permissible radiation limit, $$P^{(k)}_{max,f,c}$$

is an absolute WD-specific power limit and the function $f$ represents a maximum power back off. In some embodiments, $f$ is a function of at least one of a power class, a bandwidth allocation, band-dependent attenuation, and maximum allowed power back-off. In some embodiments, a transmission type includes at least one of a physical uplink shared channel PUSCH and a physical uplink control channel, PUCCH. In some embodiments, a transmission type includes at least one of a physical uplink shared channel, PUSCH, with uplink control information, UCI, and a PUSCH without UCI. In some embodiments, a transmission type includes a sounding reference signal, SRS. In some embodiments, the method also includes: determining a total power, $P_{CMAX}$, that includes a sum of a power of the PCell plus a power of the up to N SCells, and to apply $P_{CMAX}$; and determining an amount of power available for the up to N SCells based at least in part on a difference given by $$P_{CMAX} - P^{(k)}_{max,f,PCell}$$

where $$P^{(k)}_{max,f,PCell}$$

is power allocated to the PCell. In some embodiments, the method also incudes receiving at least one relative power limit, $$X^{(k)}_{max,f,c},$$

for a cell c in the cell group relative to a reference power and determining $P_{CMAX,f,c}(i)$ based at least in part on the difference, $$P_{CMAX,f,c} - X^{(k)}_{max,f,c}.$$

In some embodiments, the method also includes limiting the transmit power based at least in part on the first maximum power, $P_{CMAX,c,f}(i)$, for a cell c in the cell group for a first duration of time configured by the network node. In some embodiments, the method also includes counting a number of times during a time interval that the first maximum power for the PCell, $P_{CMAX,c,f}(i)$, is reached by the transmit power during the first duration of time; comparing the number of times to a threshold; and when the number of times exceeds the threshold, continuing to limit the transmit power based at least in part on $$P^{(k)}_{max,f,PCell},$$

for a current set, k, where $$P^{(k)}_{max,f,PCell}$$

is a power allocated to the PCell.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 is a flowchart of another example process in a wireless device for power control for multiple channels and power prioritization.

DETAILED DESCRIPTION

Figure 1:
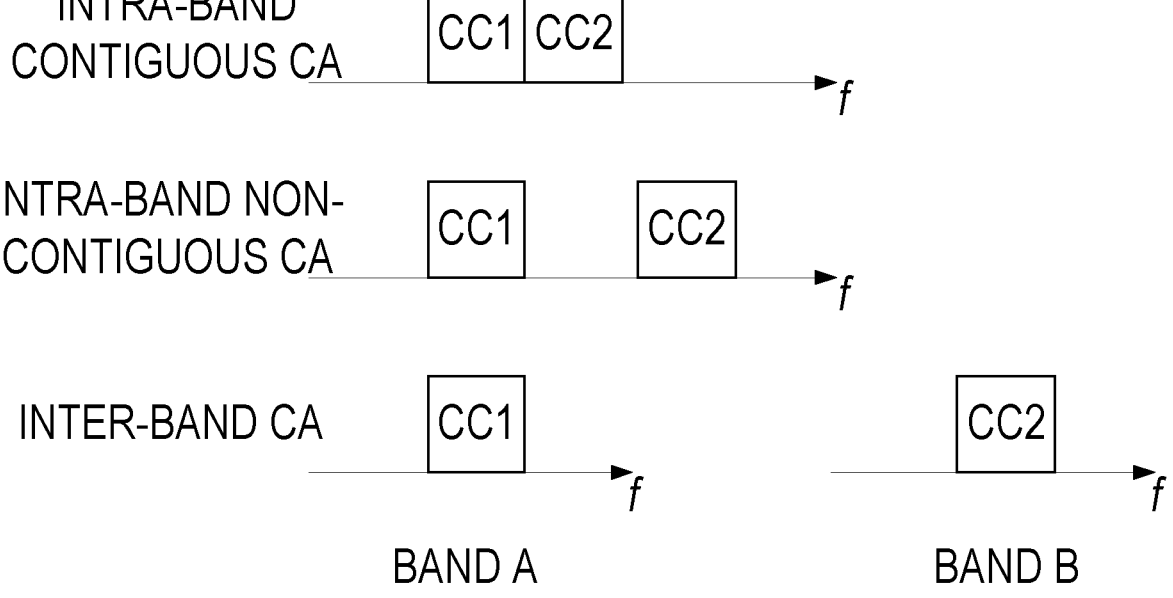
FIG. 1 illustrates carrier aggregation configurations.

Before describing in detail example embodiments, it is noted that the embodiments reside primarily in combinations of apparatus components and processing steps related to power control for multiple channels and power prioritization. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, secondary cells will not be dropped or scaled down when the WD configured with UL CA is power limited; power can be reserved for transmissions of a particular type (PRACH, PUSCH, PUCCH or SRS) by the WD. Compliance to the CA MPR requirements can be checked in WD conformance testing with all CCs transmitting at their maximum power, as intended when requirements were defined. The power limits are configured by the network enabling full network control and predictable WD behavior. The power levels on each cell is controlled and prioritized by the WD subject to the limits set by the network. DCI and MAC CE indication enable fast adaptation of power limits to changing radio conditions.

Figure 2:
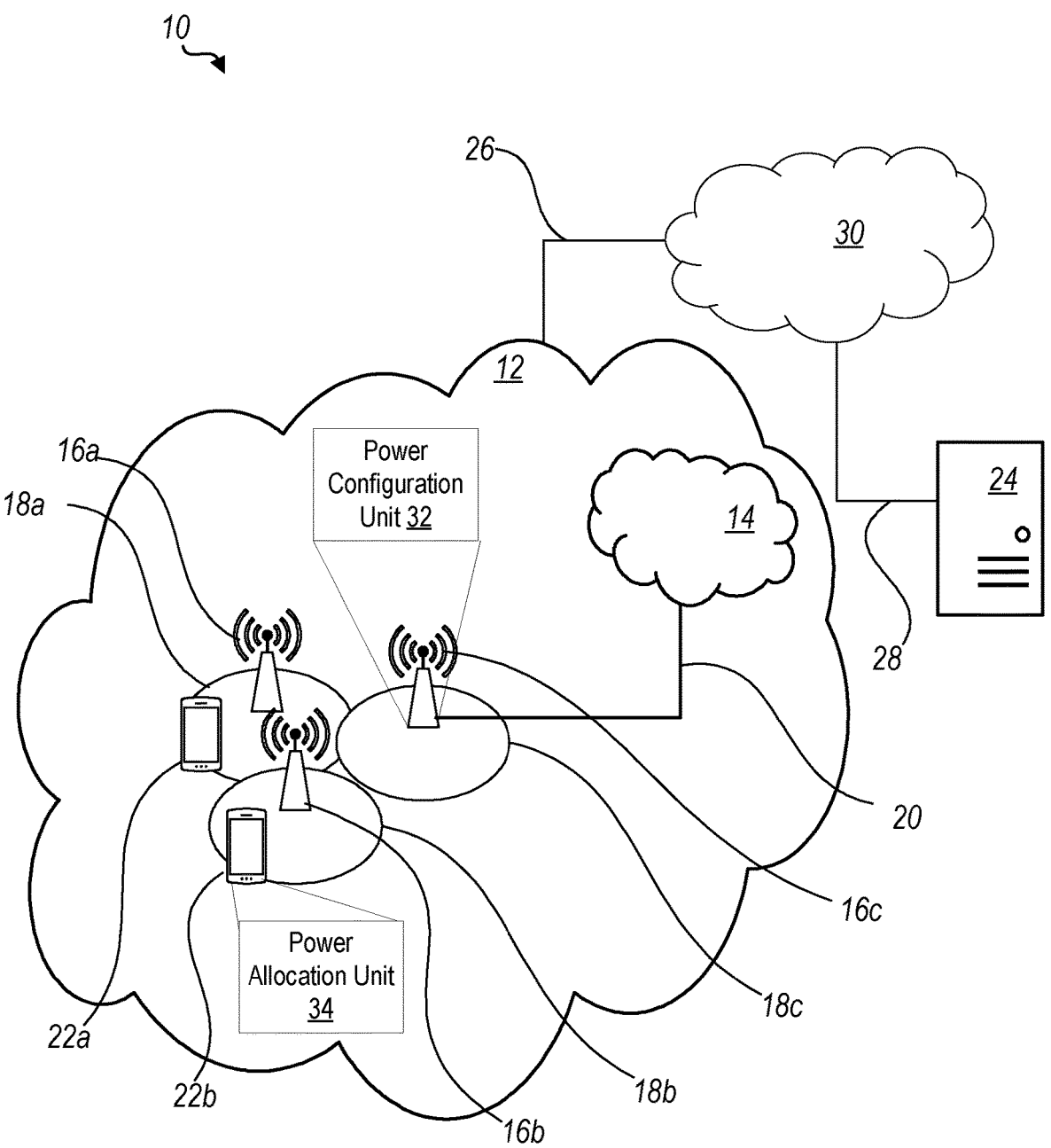
FIG. 2 is a schematic diagram of an example network architecture illustrating a communication system connected via an intermediate network to a host computer according to the principles in the present disclosure.

The WD-specific limitation $P_{max}$ per serving cell and the indication by DCI can be used for facilitating specific absorption rate (SAR) compliance for high-power WDs while adapting limits to changing radio conditions Returning now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a power configuration unit 32 configured to determine a first WD-specific power limit for each cell c of a cell group that includes at least one primary cell, PCell, and up to N secondary cells, SCells, N being a non-negative integer. The power configuration unit 32 may also be configured to configure the WD with a WD-specific power limitation for at least one serving cell, the WD-specific power limitation being less than a configured maximum power for a primary cell.

A wireless device 22 is configured to include a power allocation unit 34 which is configured to determine a first maximum power for a cell c, $P_{CMAX,f,c}(i)$, based at least in part on a first WD-specific power limit. The power allocation unit 34 may also configured to allocate a WD-specific power limitation to at least one serving cell, the WD-specific power limitation being less than a configured maximum power for a primary cell.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from)

the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a power configuration unit 32 configured to determine a first WD-specific power limit for each cell c of a cell group that includes at least one primary cell, PCell, and up to N secondary cells, SCells, N being a non-negative integer. The power configuration unit 32 may also be configured to configure the WD with a WD-specific power limitation for at least one serving cell, the WD-specific power limitation being less than a configured maximum power for a primary cell.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a power allocation unit 34 which is configured to determine a first maximum power for a cell c, $P_{CMAX,f,c}(i)$, based at least in part on a first WD-specific power limit. The power allocation unit 34 may also configured to allocate a WD-specific power limitation to at least one serving cell, the WD-specific power limitation being less than a configured maximum power for a primary cell In some embodiments, the inner workings of the network node 16, WD 22, and host computer 24 may be as shown in FIG. 3 and independently, the surrounding network topology may be that of FIG. 2.

Figure 3:
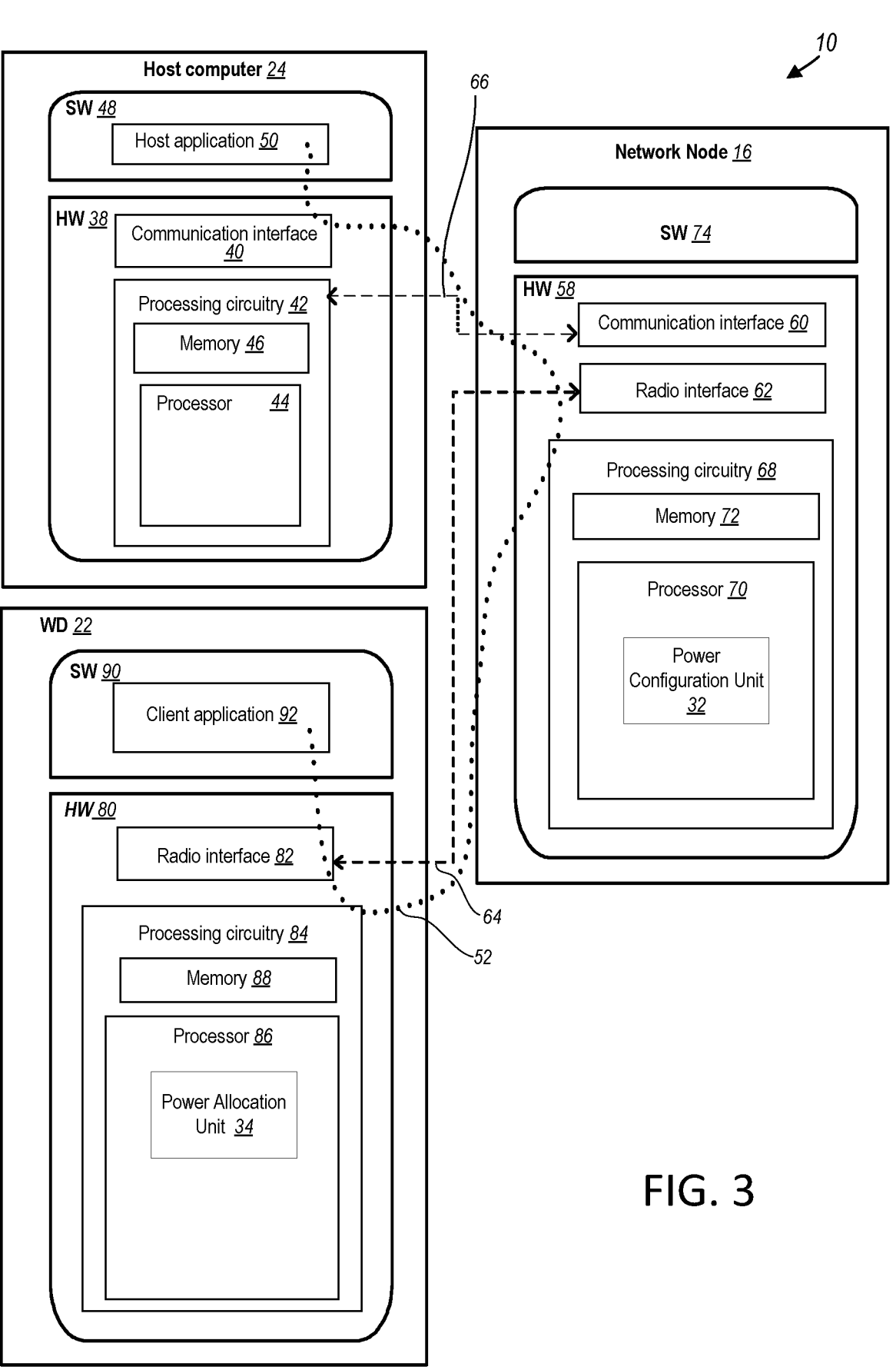
FIG. 3 is a block diagram of a host computer communicating via a network node with a wireless device over an at least partially wireless connection according to some embodiments of the present disclosure.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as power configuration unit 32, and power allocation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
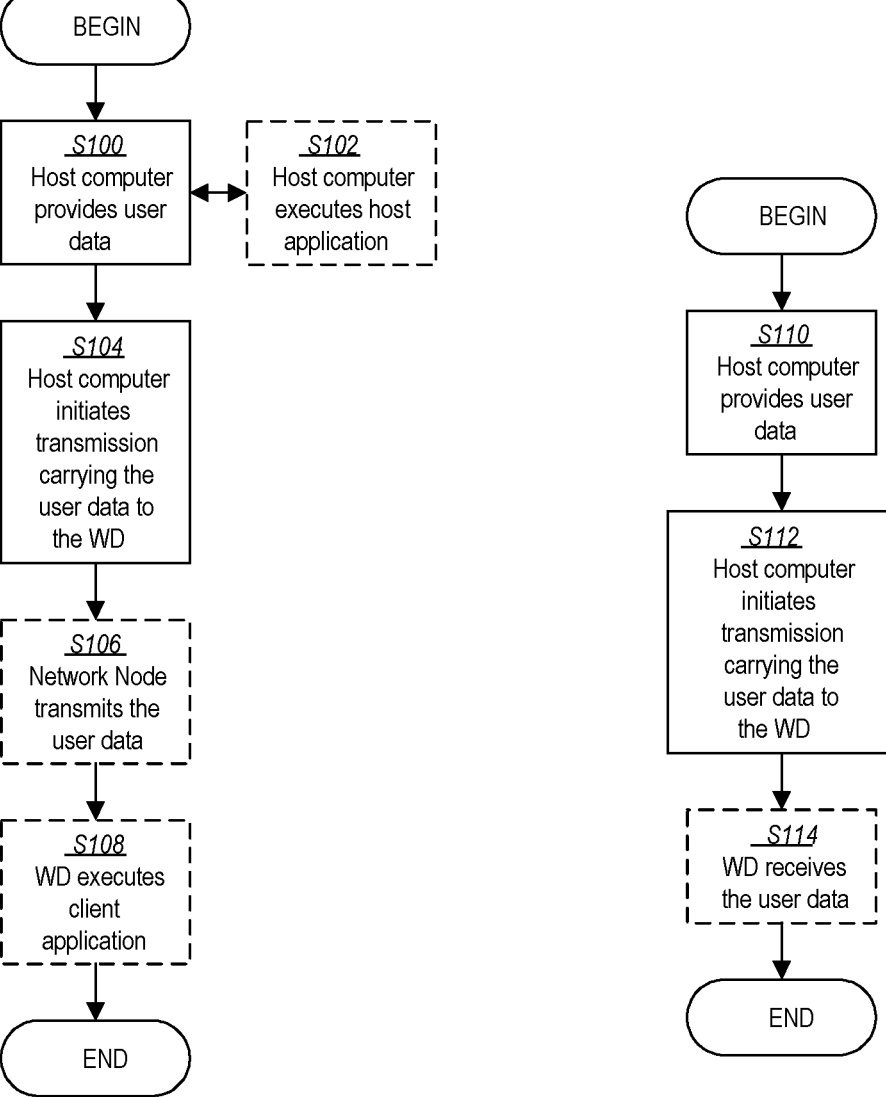
FIG. 4 is a flowchart illustrating example methods implemented in a communication system including a host computer, a network node and a wireless device for executing a client application at a wireless device according to some embodiments of the present disclosure.
FIG. 5 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
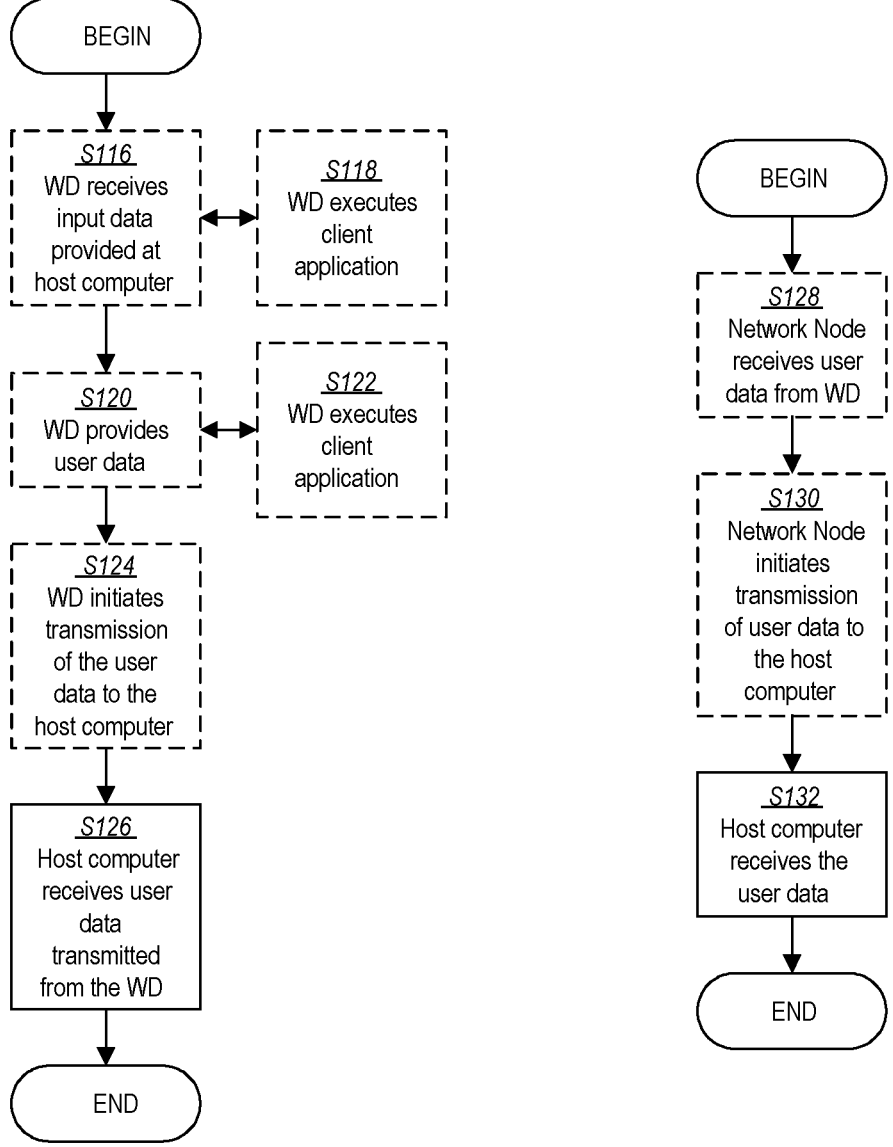
FIG. 6 is a flowchart illustrating example methods implemented in a communication system including a host computer, a network node and a wireless device for receiving user data from the wireless device at a host computer according to some embodiments of the present disclosure.
FIG. 7 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
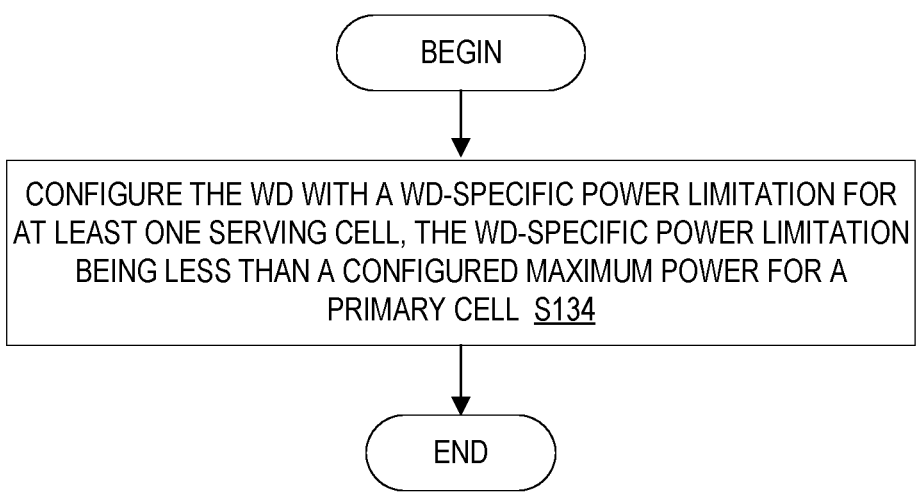
FIG. 8 is a flowchart of an example process in a network node for power control for multiple channels and power prioritization according to some embodiments of the present disclosure.

FIG. 8 is a flowchart of an example process in a network node 16 for power control for multiple channels and power prioritization. One or more blocks described herein may be performed by one or more elements of network node 16 such as by one or more of processing circuitry 68 (including the power configuration unit 32), processor 70, radio interface 62 and/or communication interface 60. Network node 16 such as via processing circuitry 68 and/or processor 70 and/or radio interface 62 and/or communication interface 60 is configured to configure the WD with a WD-specific power limitation for at least one serving cell, the WD-specific power limitation being less than a configured maximum power for a primary cell (Block S134).

Figure 9:
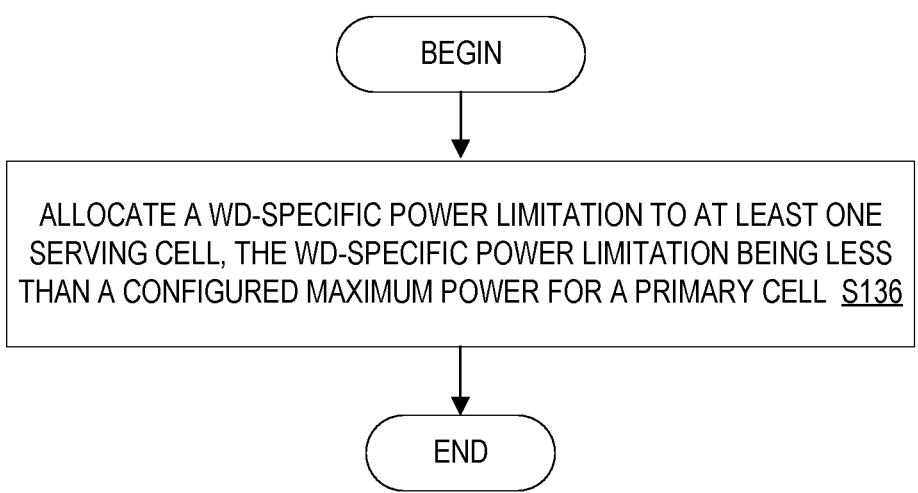
FIG. 9 is a flowchart of an example process in a wireless device for power control for multiple channels and power prioritization.

FIG. 9 is a flowchart of an example process in a wireless device 22 according to some embodiments of the present disclosure. One or more blocks described herein may be performed by one or more elements of wireless device 22 such as by one or more of processing circuitry 84 (including the power allocation unit 34), processor 86, radio interface 82 and/or communication interface 60. Wireless device 22 such as via processing circuitry 84 and/or processor 86 and/or radio interface 82 is configured to allocate a WD-specific power limitation to at least one serving cell, the WD-specific power limitation being less than a configured maximum power for a primary cell (Block S136).

Figure 10:
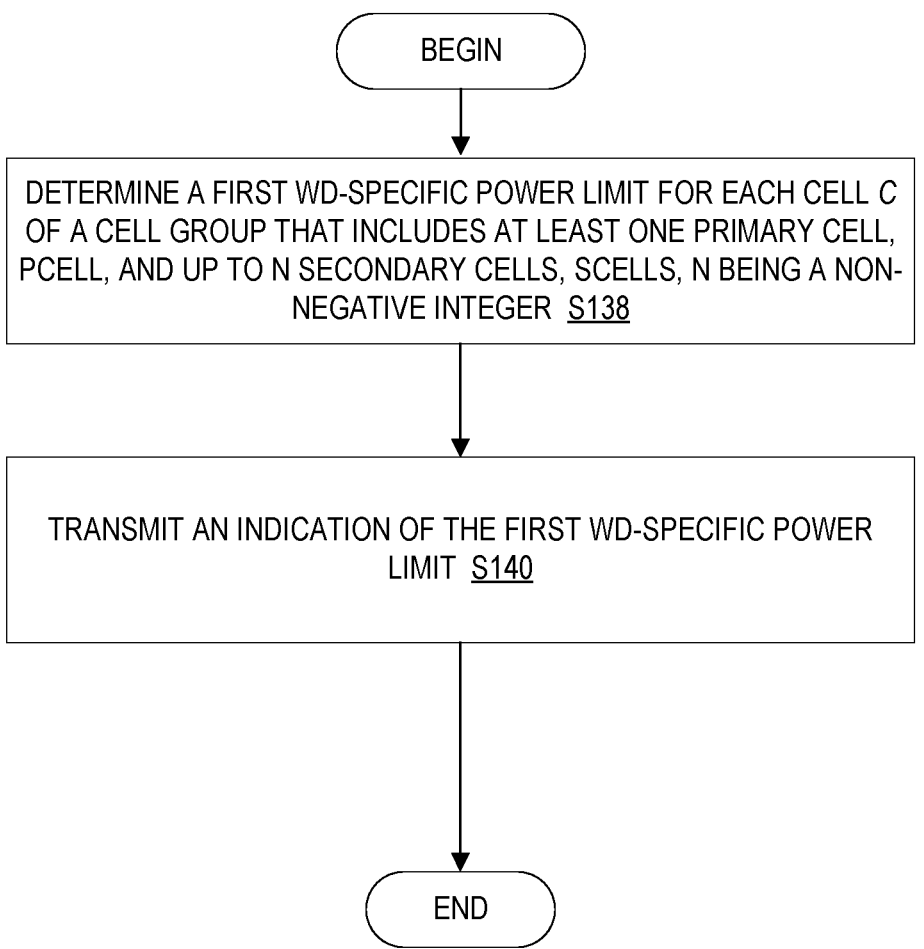
FIG. 10 is a flowchart of another example process in a network node for power control for multiple channels and power prioritization according to some embodiments of the present disclosure.

FIG. 10 is a flowchart of an example process in a network node 16 for power control for multiple channels and power prioritization. One or more blocks described herein may be performed by one or more elements of network node 16 such as by one or more of processing circuitry 68 (including the power configuration unit 32), processor 70, radio interface 62 and/or communication interface 60. Network node 16 such as via processing circuitry 68 and/or processor 70 and/or radio interface 62 and/or communication interface 60 is configured to determine a first WD-specific power limit for each cell c of a cell group that includes at least one primary cell, PCell, and up to N secondary cells, SCells, N being a non-negative integer (Block S138). The process also includes transmitting an indication of the first WD-specific power limit (Block S140).

FIG. 11 is a flowchart of an example process in a wireless device 22 according to some embodiments of the present disclosure. One or more blocks described herein may be performed by one or more elements of wireless device 22 such as by one or more of processing circuitry 84 (including the power allocation unit 34), processor 86, radio interface 82 and/or communication interface 60. Wireless device 22 such as via processing circuitry 84 and/or processor 86 and/or radio interface 82 is configured to receive a first WD-specific power limit for each cell c of a cell group that includes at least one primary cell, PCell, and up to N secondary cells, SCells, N being a non-negative integer (Block S142). The process also includes determining a first maximum power for the PCell, $P_{CMAX,f,c}(i)$, based at least in part on the first WD-specific power limit, $P_{max,f,c}$, (Block S144). The process further includes limiting a transmit power of the WD based at least in part on the first maximum power for a cell, $P_{CMAX,f,c}(i)$ (Block S146).

Having described the general process flow of arrangements of the disclosure and having provided examples of hardware and software arrangements for implementing the processes and functions of the disclosure, the sections below provide details and examples of arrangements for power control for multiple channels and power prioritization.

A prerequisite is a WD 22 configured with CA within one or more cell groups (master or secondary) with one or more UL component carriers per cell group. The WD 22 is always configured with at least one cell group (the MCG). There is normally one carrier frequency $f$ per serving cell c, but this is not a limitation: one embodiment covers the case for two carrier frequencies per cell for a supplementary uplink (SUL). The WD 22 may perform one or multiple transmissions and may need to determine the transmission power $P_{f,c}(i)$ for the given transmission that can be either PUSCH, SRS or PUCCH at a given time instance i. The transmission power can ostensibly be described by:

$$P_{f,c}(i)=\min[P_{CMAX,f,c}(i),\text{wanted transmission power}]$$
$$\text{[dBm]}$$

wherein, the $P_{CMAX,f,c}(i)$ is the configured maximum output power determined by the WD 22 based on one or more of different configured parameters, aspects related to the channel/signal that is being transmitted, capabilities of the WD and so forth. In some embodiments, the $P_{CMAX,c,f}(i)$ are determined. The "wanted transmission power" for PUSCH and SRS, and sometimes PUCCH, is roughly described as:

$$P_{c,f}(i)=mi\ n[P_{CMAX,c,f}(i),P_0+\alpha_{c,f}PL_{c,f}+10\ \log\ M_{c,f}$$
$$(i)+\Delta_{c,f}(i)+\delta_{c,f}(i)]\ dBm$$

wherein the different variables are described in the above.

In a first embodiment, the network, e.g., the via network node 16, configures the WD 22 with WD-specific power limitations a $P_{max,f,c}$ on one or more serving cell(s) c:

$$(P_{max,f,PCell},[P_{max,f,SCell(1)},\ldots,P_{max,f,SCell(n)}])$$
$$\text{[dBm]}$$

with c being a primary cell 'PCell' and up to n secondary cells 'SCell(j)' (a limit can also be set for a single cell within a cell group). The power limits apply for transmissions of any type on the cell.

The WD 22 can also be configured with sets $k \in \{0, \ldots, N-1\}$ of limits $$P_{max,f,c}^{(k)}$$

of which one or more sets k can be active $$\left(P_{max,f,PCell}^{(k)},\left[P_{max,f,Scell(1)}^{(k)},\ldots,P_{max,f,Scell(n)}^{(k)}\right]\right)\text{[dBm]}$$

The sets can be mapped to transmission of a specific type, e.g., a set k is mapped to PUSCH transmissions (the transmission power priority rules between primary and secondary cells apply per transmission type), set k+1 is mapped to PUSCH with uplink control information (UCI) (one or several of hybrid automatic repeat request acknowledgement (HARQ-ACK) and channel state information (CSI) feedback), set k+2 mapped to SRS transmission and set k+3 is mapped to PUCCH.

A second way by which the set can be defined is based on possible joint transmission types that the WD 22 will perform. The set to apply can be automatically selected by the WD 22 based on which transmission it has. For example, the WD 22 may have transmission on one cell containing a PUSCH with UCI and another cell containing a PUSCH transmission without UCI. There may be a specific set $$P_{max,f,c}^{(k)}$$

defined for a cell c where the WD 22 transmits PUSCH with UCI and another $$P_{max,f,c+1}^{(k)}$$

for cell c+1, where the WD is transmitting PUSCH without UCI. In a similar way there can be a set k defined for when PUCCH is being transmitted on one cell, $$P_{max,f,c}^{(k+1)}$$

and PUSCH on another cell $$P_{max,f,c+1}^{(k+1)}.$$

Then the WD 22 determines a configured maximum output power $P_{CMAX,c,f}(i)$ for the carrier frequency f of serving cell c that can ostensibly be described by, for any transmission type:

$$P_{CMAX,f,c}(i) \sim \min\left[P_{power\ class},f(P_{power\ class},MPR),P_{Max},P_{max,f,c}^{(k)}\right]$$

including the WD-specific limit $$P_{max,f,c}^{(k)}$$

configured by the network node 16, where $P_{power\ class}$ is the WD 22 power class applicable for serving cell c, in other words, for the operating band or for a band combination containing the cell, $P_{Max}$ is the cell-specific limitation on all WDs 22 in the cell or the WD-specific limitation on the cell-group power if configured, while the function $f(\bullet)$ represents the allowed power back-off. If the configured power $P_{CMAX,c,f}(i)$ is limited by a limit $$P_{max,f,c}^{(k)}$$

for a set k mapped to a specific transmission type, e.g., PUCCH, the limit may only apply for transmissions of the type.

If the WD 22 is configured with a UL CA (secondary cells added), the WD 22 also determines a configured total power $P_{CMAX}$ of all aggregated cells that is used for power scaling when the WD 22 is power limited. In case the network node 16 configures a set k of limits only containing a power limit $$P_{max,f,PCell}^{(k)}$$

for the PCell, then $$p_{CMAX} - p_{max,f,PCell}^{(k)}\text{[Watts]}$$

remains for secondary cells (lower-case letter used for linear scale). The network node 16 may not need to configure power limits for the secondary cells in this case. If WD-specific $P_{Max}$, is configured, then $P_{Max}$, would limit the power of all cells within a cell group, and hence also the $P_{CMAX}$, but would not allow a differentiation of the maximum power per serving cell within the group.

The above power limits may be absolute (in Watts or dBm). Setting these limits is more direct for FR1 (below 7 GHz) for which the configured maximum output power is specified (and verifiable in conformance tests) at the antenna connector. For FR2 (above 24 GHz), on the other hand, both the configured power per cell $P_{CMAX,c,f}(i)$ and the total configured power $P_{CMAX}$ are specified in implementation-specific plane of references internal to the WD. Absolute power limits configured by the network node 16 are therefore not viable for these parameters. Moreover, the WD power class for FR2 is specified in terms of EIRP (a radiated metric) that is difficult to control for WD 22 operations in the field. Notwithstanding, relative limits can also be employed for power prioritization of FR1 carrier aggregation.

In some embodiments, the network node 16 configures the WD 22 with WD-specific power limits $X_{max,f,c}$ on one or more serving cell(s) c relative to an absolute power $P_{ref}$:

$$(P_{ref}-X_{max,PCell}, [P_{ref}-X_{max,f,SCell(1)}, \ldots, P_{ref}-X_{max,f,SCell(n)}])$$

with c being the primary cell 'PCell' and up to n secondary cells 'SCell(j)'. The limits configured by the network node 16 can be relative to one or more of:

$$P_{ref} = \begin{cases} P_{CMAX} \\ P_{power\,class} \\ P_{CMAX,f,c} \end{cases}$$

i.e., an absolute power reference within the WD 22 that is per serving cell or common for all serving cells like $P_{CMAX}$ or a WD 22 capability like $P_{power\,class}$. The plane of reference for the absolute power reference $P_{ref}$ may be implementation specific (internal in the WD 22). The absolute reference is not limited to the parameters above. The WD 22 may use the configured limitations $X_{max,f,c}$ to determine a transmission power for a given serving cell by comparing it to the $P_{ref}$.

The WD 22 can also be configured with sets $k \in \{0, \ldots, N-1\}$ of relative limits $$X_{max,f,c}^{(k)}$$

of which one or more sets k can be active and possibly mapped to specific transmission types. Similar to what is described above, the set that the WD applies can be controlled by the type of transmission the WD 22 is configured to perform, e.g., a PUSCH transmission may be associated with a specific set, a PUSCH transmission without UCI may be associated with another set, a PUSCH transmission with UCI may be associated with another set, SRS transmissions may be associated with another set and PUCCH transmissions may be associated with yet another set.

For FR1, relative limits could be included in the specification of configured maximum power by modifying the actual configured power with:

$$P_{CMAX,f,c} - X_{max,f,c}^{(k)}$$

and changing the bounds in [1] as follows. The configured maximum output power $P_{CMAX,f,c}$ may be set within the following bounds:

$$P_{CMAX,L,f,c} \leq P_{CMAX,f,c} \leq P_{CMAX\_H,f,c} \text{ with}$$

$$P_{CMAX\_L,f,c} =$$

$$\mathrm{MIN}\{P_{EMAX,c} - \Delta T_{C,c}, (P_{PowerClass} - \Delta P_{PowerClass}) - \mathrm{MAX}(\mathrm{MAX}(MPR_c +$$
$$\Delta MPR_c, A-MAR_c) + \Delta T_{IB,c} + \Delta T_{C,c} + \Delta T_{RxSRS}, P - MPR_c)\} - X_{max,f,c}^{(k)}$$

$$P_{CMAX\_H,f,c} = \mathrm{MIN}\{P_{EMAX,c}, P_{PowerClass} - \Delta P_{PowerClass}\} - X_{max,f,c}^{(k)}$$

The relative limits can be mapped to a specific transmission type, e.g., PUSCH. In other words, the WD 22 may determine $P_{CMAX,f,c}$ and then also determine $P_{CMAX\_L,f,c}$ and $P_{CMAX\_H,f,c}$ based on $$X_{max,f,c}^{(k)}.$$

The WD-specific absolute limits $$P_{max,f,c}^{(k)}$$

can be included similarly to the cell-specific limit $P_{EMAX,c}$ as described earlier. Given the above it then follows that the transmission power $P_{f,c}(i)$ in the below formula:

$$P_{f,c}(i) = \min[P_{CMAX,f,c}(i), \text{wanted signal power}] \text{ [dBm]}$$

is determined based on $P_{CMAX,f,c}(i)$ which in turn is determined by $$P_{max,f,c}^{(k)}$$

and/or $$X_{max,f,c}^{(k)}.$$

If the WD operates in FR2, the network node 16 can configure a WD with a relative limit for the PCell only, for example. Then, with $P_{ref} = P_{CMAX}$ the fraction:

$$P_{CMAX,f,PCell} - P_{CMAX} = -X_{max,f,PCell} \text{ [dB]}$$

of the total power for UL CA remains for secondary cells, preventing the secondary cells from being dropped for transmissions of a specific type on all serving cells e.g., PUSCH.

Even if the above parameter is not directly observable in an FR2 conformance test, the above power fraction would be observable in a WD EIRP measurement (the WD antenna beam locked in the maximum direction). At least in the beam peak of the WD antenna, for a WD 22 under test configured with contiguous component carriers, the fraction of the total WD power remaining for secondary cells including any possible power back-off would be:

$$P_{UMAX,f,PCell} - P_{UMAX} - X_{max,f,PCell}$$

where $P_{UMAX}$ is the total EIRP of all serving cells c (the power class of the CA configuration). Hence, the power remaining for secondary cells can be observed (verified) even if the configured maximum output power levels determined by the WD 22 are internal within the WD 22. The specification of the relative limits for FR2 could be introduced in the specifications as follows.

A WD 22 configured with carrier aggregation can configure its maximum output power for each uplink activated serving cell c and its total configured maximum output power $P_{CMAX}$. The definition of the configured WD maximum output power $P_{CMAX,f,c}$ for each carrier $f$ of a serving cell c is used for power headroom reporting for carrier $f$ of serving cell c only and is, for example, in accordance with that specified in clause 6.2.4 (for the 3GPP TS discussed above) with parameters MPR, A-MPR and P-MPR replaced with those specified in subclause 6.2A.2, 6.2A.3 and 6.2.4, respectively.

If the WD is configured with a relative limits $X_{max,f,c}$, the power $P_{CMAX,f,c}$ for each carrier $f$ of a serving cell c may be reduced by value of the limits for the applicable transmission type PRACH, PUCCH, PUSCH or SRS.

The WD maximum configured power $P_{CMAX}$ in a transmission occasion is determined by the UL grants for carrier $f$ of serving cell's c(i) with non-zero granted power in the respective reference points.

For uplink intra-band contiguous carrier aggregation, MPR is specified, for example in clause 6.2A.2 (for the 3GPP TS discussed above). $P_{CMAX}$ is calculated under the assumption that power spectral density for each RB in each component carrier is same.

Upon configuration of the relative limit, the radiated power for serving cell c in the beam peak of the WD antenna is expected to be in the range:

$$P_{power\ class} - X_{max,f,c} - MPR - T(MPR) \leq P_{UMAX,f,} \\ c \leq EIRP_{max}$$

whereas the measured total radiated power per serving cell can be measured (observable) and is expected to reduce to at least:

$$P_{TMAX,f,c} \leq TRP_{max} - X_{max,f,c}\ [dBm]$$

The power back-off allowance of MPR for UL CA makes conformance prioritization of power and conformance testing of the output power more complex, particularly for FR2. In this range, the power back-off is relative to the (radiated) power class $P_{power\ class}$ but is not necessarily represented by the same value in the plane of references of the $P_{CMAX}$ or the $P_{CMAX,f,c}$ that are different and implementation specific (internal within the WD).

For intra-band CA, the MPR for each serving cell is the same as that for the total power. Hence, the same power back-off (up to MPR) is included in $P_{CMAX}$ and the $P_{CMAX,}$ $_{f,c}$. Configuring a limit $X_{max,c,PCell} > 0$ dB relative the $P_{CMAX,}$ $_{f,c}$ reduces the latter by the limit and power for SCells are therefore ensured and $P_{CMAX}$ is unchanged.

The radiated power of the Pcell in the beam peak of the WD antenna is expected to be in the range:

$$P_{power\ class} - X_{max,c,PCell} - MPR - T(MPR) \leq \\ P_{UMAX,f,PCell} \leq EIRP_{max}$$

the remaining radiated power of the total the $P_{UMAX}$ measured in the secondary cells, possibly scaled but not dropped. The total radiated power $P_{TMAX,f,PCell}$ for the PCell is expected to be reduced by $X_{max,f,PCell}$.

In another variation, the WD 22 is allowed to drop secondary cells or transmissions of lower priority if the scaling with regard to a reference power exceeds a predefined value regardless of any configured power limits.

In some embodiments, the network node 16 configures the WD-specific absolute power limitations $P_{max,f,c}$ and/or relative power limitations $X_{max,f,c}$ on one or more serving cell(s) c, sets $k \in \{0, \ldots, N-1\}$ of absolute limits $$P_{max,f,c}^{(k)}.$$

and/or relative limits $$X_{max,f,c}^{(k)}.$$

The configuration is first performed by RRC to set up the corresponding set and the values of $$P_{max,f,c}^{(k)}$$

and/or $$X_{max,f,c}^{(k)}$$

per set and serving cell(s). One special case is that there is only a single set. Further the set to be used by the WD is determined by a MAC-CE, a PDCCH message based on DCI format and/or timer(s). For a DCI message the specific set to use can either be indicated directly by a bit field in the DCI message or a specific RNTI used for the purpose of indicating that the set will change.

The configuration and indication by either MAC-CE or DCI can be sent per serving cell or on one of the cells (e.g. the primary cell) of a CA configuration in a cell group. The configuration and indication could also apply for the MCG or the SCG. A delay between DCI and/or MAC-CE indication and application of a possibly modified limit can be assumed (default) or set according to, e.g., WD capability. The delay then being indicated by the WD is part of its WD capability signalling. One way the WD determines the transmit power for a specific cell is based on $P_{CMAX,f,c}(i)$ in turn determined based on $$P_{max,f,c}^{(k)}$$

as highlighted in examples above.

In some embodiments, the network node 16 configures the limits by RRC signalling or MAC-CE with indication (or modification) of the applicable limits in a MAC-CE or DCI for fast indication.

In some embodiments, the network node 16 configures the limits by RRC signalling with deactivation of the applicable limits in a MAC-CE or DCI (disabling of the configured limits). One example is the case in which an uplink transmission is scheduled only on a single serving cell and then allocated with full power, e.g., the PCell can be transmitted with an output power up to $P_{CMAX}$.

In some embodiments, the network node 16 configures the limits by RRC signalling (i.e. the WD-specific power limitations $P_{max,f,c}$ and/or $X_{max,f,c}$ on one or more serving cell(s) c, sets $k \in \{0, \ldots, N-1\}$ of absolute limits $$P_{max,f,c}^{(k)}$$

and/or relative limits $$X_{max,f,c}^{(k)}$$

with activation of the limits in a MAC Control Element (MAC-CE) or Downlink Control Information (DCI) for the duration of a running timer. The limits being used by the WD for determining:

$$P_{f,c}(i) = \min[P_{CMAX,f,c}(i), P_0 + \alpha_{f,c} PL_{f,c} + 10 \log M_{f,c}(i) + \Delta_{f,c}(i) + \delta_{f,c}(i)]$$

wherein $P_{CMAX,f,c}(i)$ is the configured maximum power of the WD. The WD determines $P_{CMAX,f,c}(i)$ based on $$P_{max,f,c}^{(k)}$$

and/or $$X_{max,f,c}^{(k)}$$

as illustrated in other examples above.

The WD 22 will in such a mode operate an indicated set until a timer expires after which the WD 22 will fall back to a default set. There may further be one timer per serving cell or a common timer for all serving cells. If there are multiple timers, the default set is used after all other timers expire. The timers may be extended in duration if the set limits are reached within the WD 22. The specific limit being that $P_{CMAX,f,c}(i)$ used for determining $P_{f,c}(i)$. For handling a timer-based embodiment, the WD 22 may be configured with a timer length and the limits for which the timer relates to and an extension duration. The extension of the time may further be handled just by the timer restarting if the limits are reached while the timer is running. The specific limit being that $P_{CMAX,f,c}(i)$ is used for determining $P_{f,c}(i)$.

In some embodiments based on a timer, the WD 22 may count the number of times a limit has been reached. The specific limit being that $P_{CMAX,f,c}(i)$ is used for determining $P_{f,c}(i)$. If the counted number reaches a specific threshold, a timer is started and as long as the timer is running a specific set of $$P_{max,f,c}^{(k)}$$

used to determine the associated $P_{CMAX,f,c}(i)$ is activated to limit the WD transmit power. While the timer is running, and the power limitation given by the specific set has been in use, the timer can be restarted and thereby prolonging the accumulated time during which it is running. In some embodiments, the timer and the set are applicable to all transmission types, carriers and MCG and SCG. It is also possible that for a specific transmission type, e.g., PUSCH, a specific $$P_{max,f,c}^{(k)}$$

can be applied with an associated timer. Together with that for another transmission type, e.g., PUCCH, no set of $$P_{max,f,c}^{(k)}$$

could be applied or another set could be applied with its own specific associated timer. The timer length and the WD power limitation described here may be configured by the network node 16 to the WD independent from the above operational mode.

In some embodiments, the network node 16 configures a WD 22 with WD-specific power limitations $P_{max,f,c}$ for the PCell and one or more SCells to facilitate SAR compliance for high-power operation (higher than the default power class), while adapting the configured limits to changing radio conditions by MAC-CE or DCI indication. The serving cells can also belong to different cell groups (DC). Some embodiments do not require coordinated scheduling between the serving cells.

For high-power WD 22 operation for UL CA or DC, SAR compliance can be facilitated by setting power limits or restrictions to the uplink duty cycle on serving cells such that the power $\bar{p}$ averaged over at least one radio frame is less than or equal to that of the default power class ($\bar{p}=200$ mW for FR1). In an example with the primary cell in an FDD band and one secondary cell in a TDD band, the network node 16 configures a set k of absolute limits:

$$\left(P_{max,f,PCell}^{(k)}, P_{max,f,SCell}^{(k)}\right)$$

with $$p_{max,f,Pcell}^{(k)} < \bar{p}$$

(linear scale with lower-case characters) and:

$$p_{max,f,SCell}^{(k)} = \min\left[p_{power\ class,SCell}, \left(\bar{p} - p_{Max,PCell}^{(k)}\right)/u_D\right]$$

with $P_{power\ class,SCell}$ the WD power class for transmissions in the SCell and $u_D$ the maximum duty cycle of for WD transmissions on the SCell (TDD). The limits being used by the WD for determining the output power for transmission occasion i on the Pcell and SCell may be:

$$P_{f,PCell}(i) = \min[P_{CMAX,f,PCell}(i), P_0 + \alpha_{f,PCell} PL_{f,PCell} + 10 \log M_{f,PCell}(i) + \Delta_{f,PCell}(i) + \delta_{f,PCell}(i)]$$

$$P_{f,SCell}(i) = \min[P_{CMAX,f,SCell}(i) P_0 + \alpha_{f,SCell} PL_{f,SCell} + 10 \log M_{f,SCell}(i) + \Delta_{f,SCell}(i) + \delta_{f,SCell}(i)]$$

wherein $P_{CMAX,f,PCell}$ and $P_{CMAX,f,SCell}$ are the configured maximum powers of the WD for the PCell and SCell, respectively. The WD in turn determines $P_{CMAX,f,PCell}$ and $P_{CMAX,f,SCell}$ based on $$P^{(k)}_{max,f,PCell}$$

and $$P^{(k)}_{max,f,SCell}$$

for a set k of limits as illustrated in other examples, above. This set can be mapped to a specific transmission type, e.g., PUSCH or apply to all transmission types.

This enables transmissions with a power exceeding $\bar{p}$ during transmission bursts on the SCell (high-power operation). The average would not exceed:

$$p^{(k)}_{max,f,PCell} + u_D p^{(k)}_{max,f,SCell} \leq \bar{p}$$

regardless of scheduled uplink traffic on the two serving cells. The power limitation can be removed temporarily in poor radio conditions on the PCell by indicating another set in DCI or disable the power limitations by DCI indication whence all available WD output power can be allocated temporarily to the PCell (FDD). There is no need for RRC reconfiguration (slow) to this end.

In a fourth embodiment, the network node 16 configures the WD 22 with WD-specific set i of power limitations in a serving cell c with two carrier frequencies $f_1$ for a normal uplink (NUL) and $f_2$ for a supplementary uplink (SUL):

$$\left(P^{(k)}_{max,f_1,c}, P^{(k)}_{max,f_2,c}\right)$$

The teachings of the above embodiments for UL CA can be applied with multiple carrier frequencies f in one serving cell replacing multiple serving cells c of an UL CA configuration (with one carrier frequency per cell). In a variation, the network node 16 configures the WD with WD-specific set(s) i of power limitations for CA band combinations of serving cells some of which have more than one carrier frequency (an SUL).

According to one aspect, a network node 16 configured to communicate with a wireless device (WD) 22 is provided. The network node 16 includes a radio interface 62 and/or comprising processing circuitry 68 configured to configure the WD 22 with a WD-specific power limitation for at least one serving cell, the WD-specific power limitation being less than a configured maximum power for a primary cell.

According to this aspect, in some embodiments, a power equal to the difference between the WD-specific power limitation and the maximum power for the primary cell is allocated to secondary cells. In some embodiments, a power equal to the difference between the WD-specific power limitation and the maximum power for the primary cell is allocated to one of a physical random access channel (PRACH), physical uplink shared channel (PUSCH), physical uplink control channel and/or a sounding reference signal (SRS). In some embodiments, the WD-specific power limitation is configured to enable specific absorption rate (SAR) compliance.

According to another aspect, a method implemented in a network node 16 includes configuring a wireless device (WD) with a WD-specific power limitation for at least one serving cell, the WD-specific power limitation being less than a configured maximum power for a primary cell.

According to this aspect, in some embodiments, a power equal to the difference between the WD-specific power limitation and the maximum power for the primary cell is allocated to secondary cells. In some embodiments, a power equal to the difference between the WD-specific power limitation and the maximum power for the primary cell is allocated to one of a physical random access channel (PRACH), physical uplink shared channel (PUSCH), physical uplink control channel and/or a sounding reference signal (SRS). In some embodiments, the WD-specific power limitation is configured to enable specific absorption rate (SAR) compliance.

According to yet another aspect, a wireless device (WD) is configured to communicate with a network node 16. The WD 22 includes a radio interface 82 and/or processing circuitry 84 configured to allocate a WD-specific power limitation to at least one serving cell, the WD-specific power limitation being less than a configured maximum power for a primary cell.

According to this aspect, in some embodiments, a power equal to the difference between the WD-specific power limitation and the maximum power for the primary cell is allocated to one of a physical random access channel (PRACH), physical uplink shared channel (PUSCH), physical uplink control channel and/or a sounding reference signal (SRS). In some embodiments, a power equal to the difference between the WD-specific power limitation and the maximum power for the primary cell is allocated to secondary cells. In some embodiments, the WD-specific power limitation is configured to enable specific absorption rate (SAR) compliance.

According to another aspect, a method implemented in a wireless device (WD) includes allocating a WD-specific power limitation to at least one serving cell, the WD-specific power limitation being less than a configured maximum power for a primary cell.

According to this aspect, in some embodiments, a power equal to the difference between the WD-specific power limitation and the maximum power for the primary cell is allocated to one of a physical random access channel (PRACH), physical uplink shared channel (PUSCH), physical uplink control channel and/or a sounding reference signal (SRS). In some embodiments, a power equal to the difference between the WD-specific power limitation and the maximum power for the primary cell is allocated to secondary cells. In some embodiments, the WD-specific power limitation is configured to enable specific absorption rate (SAR) compliance.

Some embodiments may include the following:

A method is provided by which the network node 16 configures a WD 22 with WD-specific power limits used by the WD 22 for determining the output power for UL serving cells of a CA configuration to prevent that serving cells or transmissions of a specific type are dropped or scaled as part of the WD 22 power prioritization. In some embodiments, the network node 16 configures sets of power limits. In some embodiments, the power limits are absolute (in dBm). In some embodiments, the power limits are relative to one or more absolute references (in dBm) some of which may be implementation specific internal within the WD 22. In some embodiments, the network node 16 configures sets of power limits mapped to transmissions of a specific type. In some embodiments, the power limits are configured/indicated by higher-layer (RRC), MAC-CE or DCI signalling. In some embodiments, combination(s) of higher-layer (RRC messaging), MAC-CE or DCI signalling is used. In some embodiments, power limits or sets thereof configured by higher layers are indicated by MAC-CE or DCI enabling fast adaptation of limits to changing radio conditions. In some embodiments, SAR compliance is facilitated for DC or UL CA high-power operations combined with the methods in 6-8 for fast adaptation to changing radio conditions thus avoiding the need for RRC reconfiguration by known methods. In some embodiments, multiple UL carrier frequencies in a serving cell (supplementary uplink) are provided.

According to one aspect, a network node 16 configured to communicate with a wireless device, WD 22, is provided. The network node 16 includes processing circuitry 68 is configured to determine a first WD-specific power limit for each cell c of a cell group that includes at least one primary cell, PCell, and up to N secondary cells, SCells, N being a non-negative integer. The network node 16 also includes a radio interface 62 in communication with the processing circuitry 68, the radio interface 62 configured to transmit an indication of the first WD-specific power limit.

According to this aspect, in some embodiments, the processing circuitry 68 is further configured to determine a first cell-specific power limit, $P_{Max}$, that applies to all WDs within a cell, each WD 22 configured to use the PCell and the up to N SCells. In some embodiments, the first WD-specific power limit is transmission type-specific, a transmission type including at least one of a physical uplink shared channel PUSCH and a physical uplink control channel, PUCCH. In some embodiments, the first WD-specific power limit is transmission type-specific, a transmission type including at least one of a physical uplink shared channel, PUSCH, with uplink control information, UCI, and a PUSCH without UCI. In some embodiments, the first WD-specific power limit is also transmission type-specific, a transmission type including a sounding reference signal, SRS. In some embodiments, the processing circuitry 68 is further configured to determine WD-specific power limits, $$X_{max,f,c}^{(k)},$$

for each cell c in the cell group relative to a reference level, where k denotes a particular one of at least one set, each of the at least one set corresponding to a transmission type. In some embodiments, the processing circuitry 68 is further configured to adapt the at least one first WD-specific power limit based at least in part on a state of a radio channel between the network node 16 and the WD 22. In some embodiments, the processing circuitry 68 is further configured configure an uplink duty cycle of at least one serving cell to achieve an average power during a time duration that is not greater than a default power class limit. In some embodiments, the first WD-specific power limit is indicated by at least one of downlink control information, DCI, and a medium access control, MAC, CE. In some embodiments, the first WD-specific power limit for each cell c in the cell group is configured for each of a plurality of carrier frequencies, According to another aspect, a method in a network node 16 configured to communicate with a wireless device, WD 22, is provided. The method includes determining a first WD-specific power limit for each cell c of a cell group that includes at least one primary cell, PCell, and up to N secondary cells, SCells, N being a non-negative integer. The method also includes transmitting an indication of the first WD-specific power limit.

According to this aspect, in some embodiments, the method further includes determining a first cell-specific power limit, $P_{Max}$, that applies to all WDs within a cell, each WD 22 configured to use the PCell and the up to N SCells. In some embodiments, the first WD-specific power limit is transmission type-specific, a transmission type including at least one of a physical uplink shared channel PUSCH and a physical uplink control channel, PUCCH. In some embodiments, the first WD-specific power limit is transmission type-specific, a transmission type including at least one of a physical uplink shared channel, PUSCH, with uplink control information, UCI, and a PUSCH without UCI. In some embodiments, the first WD-specific power limit is transmission type-specific, a transmission type including a sounding reference signal, SRS. In some embodiments, the method also includes determining WD-specific power limits, $$X_{max,f,c}^{(k)},$$

for each cell c in the cell group relative to a reference level, where k denotes a particular one of at least one set, each of the at least one set corresponding to a transmission type. In some embodiments, the method also includes adapting the at least one first WD-specific power limit based at least in part on a state of a radio channel between the network node 16 and the WD 22. In some embodiments, the method also includes configuring an uplink duty cycle of at least one serving cell to achieve an average power during a time duration that is not greater than a default power class limit. In some embodiments, the first WD-specific power limit is indicated by at least one of downlink control information, DCI, and a medium access control, MAC, CE. In some embodiments, the first WD-specific power limit for each cell c in the cell group is configured for each of a plurality of carrier frequencies, According to yet another aspect, a WD 22 is configured to communicate with a network node 16. The WD 22 includes a radio interface 82 configured to receive a first WD-specific power limit for each cell c of a cell group that includes at least one primary cell, PCell, and up to N secondary cells, SCells, N being a non-negative integer. The WD 22 also includes processing circuitry 84 in communication with the radio interface 82, the processing circuitry 84 configured to: determine a first maximum power for a cell c, $P_{CMAX,f,c}(i)$, based at least in part on the first WD-specific power limit; and limit a transmit power of the WD 22 based at least in part on the first maximum power for the PCell, $P_{CMAX,f,c}(i)$.

According to this aspect, in some embodiments, the radio interface 82 is further configured to receive a first cell-specific power limit, $P_{Max}$, that applies to all WDs within a cell, each WD 22 configured to use the PCell and the up to N SCells and wherein $P_{CMAX,f,c}(i)$ is further based at least in part on the first cell-specific power limit, $P_{Max}$. In some embodiments, the processing circuitry 82 is further configured to determine $P_{CMAX,f,c}(i)$ by determining:

$$P_{CMAX,f,c}(i) = \min\left[P_{power\,class}, f(P_{power\,class}, MPR), P_{Max}, P_{max,f,c}^{(k)}\right]$$

where $P_{power\,class}$ is a WD 22 power class applicable to a serving cell operating frequency band, k indicates a transmission type, MPR is a maximum permissible radiation limit, $$P_{max,f,c}^{(k)}$$

is an absolute WD-specific power limit and the function $f$ represents a maximum power back off. In some embodiments, $f$ is a function of at least one of a power class, a bandwidth allocation, band-dependent attenuation, and maximum allowed power back-off. In some embodiments, a transmission type includes at least one of a physical uplink shared channel PUSCH and a physical uplink control channel, PUCCH. In some embodiments, a transmission type includes at least one of a physical uplink shared channel, PUSCH, with uplink control information, UCI, and a PUSCH without UCI. In some embodiments, a transmission type includes a sounding reference signal, SRS. In some embodiments, the processing circuitry is further configured to: determine a total power, $P_{CMAX}$, that includes a sum of a power of the PCell plus a power of the up to N SCells, and to apply $P_{CMAX}$; and determine an amount of power available for the up to N SCells based at least in part on a difference given by $$P_{CMAX} - P_{max,f,PCell}^{(k)}$$

where $$P_{max,f,PCell}^{(k)}$$

is power allocated to the PCell. In some embodiments, the radio interface is further configured to receive at least one relative power limit, $$X_{max,f,c}^{(k)},$$

for a cell c in the cell group relative to a reference level and the processing circuitry is further configured to determine $P_{CMAX,f,c}(i)$ based at least in part on the difference, $$P_{CMAX,f,c} - X_{max,f,c}^{(k)}.$$

In some embodiments, the processing circuitry 84 is further configured to limit the transmit power based at least in part on the first maximum power, $P_{CMAX,f,c}(i)$, for a cell c in the cell group for a first duration of time configured by the network node 16. In some embodiments, the processing circuitry 84 is further configured to: count a number of times during a time interval that the first maximum power for the PCell, $P_{CMAX,f,c}(i)$, is reached by the transmit power during the first duration of time; compare the number of times to a threshold; and when the number of times exceeds the threshold, continuing to limit the transmit power based at least in part on $$P_{max,f,PCell}^{(k)},$$

for a current set, k, where $$P_{max,f,PCell}^{(k)}$$

is a power allocated to the PCell.

According to another aspect, a method is provided in a wireless device, WD 22, configured to communicate with a network node 16. The method includes receiving a first WD-specific power limit for each of at least one primary cell, PCell, and up to N secondary cells, SCells, N being a non-negative integer. The method also includes determining a first maximum power for the PCell, $P_{CMAX,f,c}(i)$, based at least in part on the first WD-specific power limit, $P_{max,f,c}$. The method also includes limiting a transmit power of the WD 22 based at least in part on the first maximum power for the PCell, $P_{CMAX,f,c}(i)$.

According to this aspect, in some embodiments, the method includes receiving the first cell-specific power limit, $P_{Max}$, that applies to all WDs within a cell, each WD 22 configured to use the PCell and the up to N SCells, and wherein $P_{CMAX,f,c}(i)$, is further based at least in part on a first cell-specific power limit, $P_{Max}$. In some embodiments, the method also includes determining $P_{CMAX,c,f}(i)$ includes determining:

$$P_{CMAX,f,c}(i) = \min\left[P_{power\,class}, f(P_{power\,class}, MPR), P_{Max}, P_{max,f,c}^{(k)}\right]$$

where $P_{power\,class}$ is a WD 22 power class applicable to a serving cell operating frequency band, k indicates a transmission type, MPR is a maximum permissible radiation limit, $$P_{max,f,c}^{(k)}$$

is an absolute WD-specific power limit and the function $f$ represents a maximum power back off. In some embodiments, $f$ is a function of at least one of a power class, a bandwidth allocation, band-dependent attenuation, and maximum allowed power back-off. In some embodiments, a transmission type includes at least one of a physical uplink shared channel PUSCH and a physical uplink control channel, PUCCH. In some embodiments, a transmission type includes at least one of a physical uplink shared channel, PUSCH, with uplink control information, UCI, and a PUSCH without UCI. In some embodiments, a transmission type includes a sounding reference signal, SRS. In some embodiments, the method also includes: determining a total power, $P_{CMAX}$, that includes a sum of a power of the PCell plus a power of the up to N SCells, and to apply $P_{CMAX}$; and determining an amount of power available for the up to N SCells based at least in part on a difference given by $$P_{CMAX} - P_{max,f,PCell}^{(k)}$$

where $$P_{max,f,PCell}^{(k)}$$

is power allocated to the PCell. In some embodiments, the method also includes receiving at least one relative power limit, $$X_{max,f,c}^{(k)},$$

for a cell c in the cell group relative to a reference power and determining $P_{CMAX,f,c}(i)$ based at least in part on the difference, $$P_{CMAX,f,c} - X_{max,f,c}^{(k)}.$$

In some embodiments, the method also includes limiting the transmit power based at least in part on the first maximum power, $P_{CMAX,c,f}(i)$, for a cell c in the cell group for a first duration of time configured by the network node 16. In some embodiments, the method also includes counting a number of times during a time interval that the first maximum power for the PCell, $P_{CMAX,c,f}(i)$, is reached by the transmit power during the first duration of time; comparing the number of times to a threshold; and when the number of times exceeds the threshold, continuing to limit the transmit power based at least in part on $$P_{max,f,PCell}^{(k)},$$

for a current set, k, where $$P_{max,f,PCell}^{(k)}$$

is a power allocated to the PCell.

Some embodiments may include the following:

Embodiment A1. A network node 16 configured to communicate with a wireless device (WD), the network node 16 configured to, and/or comprising a radio interface and/or comprising processing circuitry configured to:

configure the WD 22 with a WD-specific power limitation for at least one serving cell, the WD-specific power limitation being less than a configured maximum power for a primary cell.

Embodiment A2. The network node 16 of Embodiment A1, wherein a power equal to the difference between the WD-specific power limitation and the maximum power for the primary cell is allocated to secondary cells.

Embodiment A3. The network node 16 of Embodiment A1, wherein a power equal to the difference between the WD-specific power limitation and the maximum power for the primary cell is allocated to one of a physical random access channel (PRACH), physical uplink shared channel (PUSCH), physical uplink control channel and/or a sounding reference signal (SRS).

Embodiment A4. The network node 16 of any one of Embodiments A1-A3, wherein the WD-specific power limitation is configured to enable specific absorption rate (SAR) compliance.

Embodiment B1. A method implemented in a network node 16, the method comprising:

configuring a wireless device (WD) with a WD-specific power limitation for at least one serving cell, the WD-specific power limitation being less than a configured maximum power for a primary cell.

Embodiment B2. The method of Embodiment B1, wherein a power equal to the difference between the WD-specific power limitation and the maximum power for the primary cell is allocated to secondary cells.

Embodiment B3. The method of Embodiment B1, wherein a power equal to the difference between the WD-specific power limitation and the maximum power for the primary cell is allocated to one of a physical random access channel (PRACH), physical uplink shared channel (PUSCH), physical uplink control channel and/or a sounding reference signal (SRS).

Embodiment B4. The method of any one of Embodiments B1-B3, wherein the WD-specific power limitation is configured to enable specific absorption rate (SAR) compliance.

Embodiment C1. A wireless device (WD) configured to communicate with a network node 16, the WD 22 configured to, and/or comprising a radio interface and/or processing circuitry configured to:

allocate a WD-specific power limitation to at least one serving cell, the WD-specific power limitation being less than a configured maximum power for a primary cell.

Embodiment C2. The WD 22 of Embodiment C1, wherein a power equal to the difference between the WD-specific power limitation and the maximum power for the primary cell is allocated to one of a physical random access channel (PRACH), physical uplink shared channel (PUSCH), physical uplink control channel and/or a sounding reference signal (SRS).

Embodiment C3. The WD 22 of Embodiment C1, wherein a power equal to the difference between the WD-specific power limitation and the maximum power for the primary cell is allocated to secondary cells.

Embodiment C4. The WD 22 of any one of Embodiments C1-C3, wherein the WD-specific power limitation is configured to enable specific absorption rate (SAR) compliance.

Embodiment D1. A method implemented in a wireless device (WD), the method comprising:

allocating a WD-specific power limitation to at least one serving cell, the WD-specific power limitation being less than a configured maximum power for a primary cell.

Embodiment D2. The method of Embodiment D1, wherein a power equal to the difference between the WD-specific power limitation and the maximum power for the primary cell is allocated to one of a physical random access channel (PRACH), physical uplink shared channel (PUSCH), physical uplink control channel and/or a sounding reference signal (SRS).

Embodiment D3. The method of Embodiment D1, wherein a power equal to the difference between the WD-specific power limitation and the maximum power for the primary cell is allocated to secondary cells.

Embodiment D4. The method of any one of Embodiments D1-D3, wherein the WD-specific power limitation is configured to enable specific absorption rate (SAR) compliance.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node configured to communicate with a wireless device, WD, the network node comprising:
   processing circuitry configured to determine a first WD-specific power limit for each cell c of a cell group that includes at least one primary cell, PCell, and up to N secondary cells, SCells, N being a non-negative integer;
   a radio interface in communication with the processing circuitry, the radio interface configured to transmit an indication of the first WD-specific power limit; and
   the processing circuitry being further configured to:
   determine a first cell-specific power limit, $P_{Max}$, that applies to all WDs within a cell, each WD configured to use the PCell and the up to N SCells; and
   configure an uplink duty cycle of at least one serving cell to achieve an average power during a time duration that is not greater than a default power class limit.

2. The network node of claim 1,
   wherein the processing circuitry is further configured to determine WD-specific power limits, $$X_{max,f,c}^{(k)},$$

for each cell c in the cell group relative to a reference level, where k denotes a particular one of at least one set, each of the at least one set corresponding to a transmission type.

3. The network node of claim 1, wherein the first WD-specific power limit is indicated by at least one of downlink control information, DCI, and a medium access control, MAC CE.

4. The network node of claim 1, wherein the first WD-specific power limit for each cell c in the cell group is configured for each of a plurality of carrier frequencies.

5. A method in a network node configured to communicate with a wireless device, WD, the method comprising:

determining a first WD-specific power limit for each cell c of a cell group that includes at least one primary cell, PCell, and up to N secondary cells, SCells, N being a non-negative integer; and transmitting an indication of the first WD-specific power limit;

determining a first cell-specific power limit, $P_{Max}$, that applies to all WDs within a cell, each WD configured to use the PCell and the up to N SCells; and configuring an uplink duty cycle of at least one serving cell to achieve an average power during a time duration that is not greater than a default power class limit.

6. The method of claim 5, further comprising determining WD-specific power limits, $$X_{max,f,c}^{(k)},$$

for each cell c in the cell group relative to a reference level, where k denotes a particular one of at least one set, each of the at least one set corresponding to a transmission type.

7. The method of claim 5, wherein the first WD-specific power limit is indicated by at least one of downlink control information, DCI, and a medium access control, MAC CE.

8. The method of claim 5, wherein the first WD-specific power limit for each cell c in the cell group is configured for each of a plurality of carrier frequencies.

9. A wireless device, WD, configured to communicate with a network node, the WD comprising:

a radio interface configured to receive a first WD-specific power limit for each cell c of a cell group that includes at least one primary cell, PCell, and up to N secondary cells, SCells, N being a non-negative integer;

processing circuitry in communication with the radio interface, the processing circuitry configured to:

determine a first maximum power for a cell c, $P_{CMAX,f,c}(i)$ in the cell group, based at least in part on the first WD-specific power limit;

limit a transmit power of the WD based at least in part on the first maximum power for a cell, $P_{CMAX,f,c}(i)$;

cause transmission of one or more uplink channels in one or more of the cells in the cell groups using the determined limited transmit power;

determine a total power, $P_{CMAX}$, that includes a sum of a power of the PCell plus a power of the up to N SCells, and to apply $P_{CMAX}$; and determine an amount of power available for the up to N SCells based at least in part on a difference given by $$P_{CMAX} - P_{max,f,Pcell}^{(k)}$$

where $$P_{max,f,Pcell}^{(k)}$$

is power allocated to the PCell; and the radio interface being further configured to receive a first cell-specific power limit, $P_{Max}$, that applies to all WDs within a cell, each WD configured to use the PCell and the up to N SCells and $P_{CMAX,f,c}(i)$, being further based at least in part on the first cell-specific power limit, $P_{Max}$.

10. The WD of claim 9, wherein the radio interface is further configured to receive at least one relative power limit, $$X_{max,f,c}^{(k)},$$

for a cell c in the cell group relative to a reference level and the processing circuitry is further configured to determine $P_{CMAX,f,c}(i)$ based at least in part on the difference, $P_{CMAX,f,c} - X_{max,f,c}^{(k)}$.

11. The WD of claim 9, wherein the processing circuitry is further configured to limit the transmit power based at least in part on the first maximum power, $P_{CMAX,f,c}(i)$, for a cell c in the cell group for a first duration of time configured by the network node.

12. The WD of claim 11, wherein the processing circuitry is further configured to:

count a number of times during a time interval that the first maximum power for the PCell, $P_{CMAX,f,c}(i)$, is reached by the transmit power during the first duration of time;

compare the number of times to a threshold; and when the number of times exceeds the threshold, continuing to limit the transmit power based at least in part on $$P_{max,f,Pcell}^{(k)},$$

for a current set, k, where $$P_{max,f,Pcell}^{(k)}$$

is a power allocated to the PCell.

13. A method in a wireless device, WD, configured to communicate with a network node, the method comprising:

receiving a first WD-specific power limit, $P_{max,f,c}$, for each of at least one primary cell, PCell, and up to N secondary cells, SCells, N being a non-negative integer; determining a first maximum power for a cell, $P_{CMAX,f,c}(i)$, based at least in part on the first WD-specific power limit;

limiting a transmit power of the WD based at least in part on the first maximum power for a cell, $P_{CMAX,f,c}(i)$;

transmitting one or more uplink channels in one or more of the cells in the cell groups using the determined limited transmit power;

receiving the first cell-specific power limit, $P_{Max}$, that applies to all WDs within a cell, each WD configured to use the PCell and the up to N SCells, and $P_{CMAX,f,c}(i)$, being further based at least in part on a first cell-specific power limit, $P_{Max}$;

determining a total power, $P_{CMAX}$, that includes a sum of a power of the PCell plus a power of the up to N SCells, and to apply $P_{CMAX}$; and determining an amount of power available for the up to N SCells based at least in part on a difference given by $$P_{CMAX} - P^{(k)}_{max,f,Pcell},$$

where $$P^{(k)}_{max,f,Pcell}$$

is power allocated to the PCell.

14. The method of claim 13, further comprising receiving at least one relative power limit, $$X^{(k)}_{max,f,c},$$

for a cell c in the cell group relative to a reference power and determining $P_{CMAX,f,c}(i)$ based at least in part on the difference, $P_{CMAX,f,c} - X^{(k)}_{max,f,c}$.

15. The method of claim 13, further comprising limiting the transmit power based at least in part on the first maximum power, $P_{CMAX,f,c}(i)$, for a cell c in the cell group for a first duration of time configured by the network node.

16. The method of claim 15, further comprising: counting a number of times during a time interval that the first maximum power for the PCell, $P_{CMAX,c,f}(i)$, is reached by the transmit power during the first duration of time; comparing the number of times to a threshold; and when the number of times exceeds the threshold, continuing to limit the transmit power based at least in part on $$P^{(k)}_{max,f,Pcell},$$

for a current set, k, where $$P^{(k)}_{max,f,Pcell}$$

is a power allocated to the PCell.

\* \* \* \* \*